US011334598B2

(12) United States Patent
Loch et al.

(10) Patent No.: US 11,334,598 B2
(45) Date of Patent: *May 17, 2022

(54) COMPUTER-IMPLEMENTED MANAGEMENT OF BOOKINGS FOR TRANSPORTATION SERVICES

(71) Applicant: Surge Pricing Patent Holdings, LLC, Wilmington, DE (US)

(72) Inventors: Andrew Loch, Worongary (AU); Helen Johnson, Red Hill (AU); Geoffrey Toogood, Forest Lake (AU); Daniel Paul Ruul, Labrador (AU)

(73) Assignee: SurgeTech, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,933

(22) Filed: Dec. 6, 2021

(65) Prior Publication Data
US 2022/0092084 A1 Mar. 24, 2022

Related U.S. Application Data

(63) Continuation of application No. 16/924,395, filed on Jul. 9, 2020, which is a continuation of application
(Continued)

(51) Int. Cl.
*G06F 7/00* (2006.01)
*G06F 16/27* (2019.01)

(52) U.S. Cl.
CPC .................................. *G06F 16/273* (2019.01)

(58) Field of Classification Search
CPC .................................................... G06F 16/273
See application file for complete search history.

(56) References Cited

U.S. PATENT DOCUMENTS 5,787,415 A * 7/1998 Jacobson ............ G06F 16/2365
7,275,131 B2 * 9/2007 Goodman ........... G06F 12/0815
711/106
(Continued)

FOREIGN PATENT DOCUMENTS

AU 2007252290 A1 * 1/2009 ........... G06F 16/273
GB 2302427 1/1997
(Continued)

OTHER PUBLICATIONS

Belobaba, Peter Paul, "Air Travel Demand and Airline Seat Inventory Management," Department of Aeronautics and Astronautics, Massachusetts Institute of Technology, May 1987.
(Continued)

*Primary Examiner* — Talia F Crawley
(74) *Attorney, Agent, or Firm* — Patent Ingenuity, P.C.; Samuel K. Simpson

(57) ABSTRACT

A computer-implemented method of managing online bookings for transportation services inventory is provided. The computer-implemented method links, via a computerized network, each item in the transportation services inventory with one of a plurality of online distributions channels by allocating the item to the respective online distribution channel. Furthermore, the computer-implemented method receives, from each of a plurality of online distribution channels in real time via the computerized network, sale data pertaining to the online bookings for the items in the transportation services inventory allocated to the respective online distribution channel. The computer-implemented method processes the sale data by carrying out calculations to obtain a performance rating for each of the respective online distribution channels. Additionally, the computer-implemented method queries whether the performance rating of each of the respective online distribution channels is
(Continued)

greater than a performance rating of other online distribution channels.

24 Claims, 12 Drawing Sheets

Related U.S. Application Data

No. 16/150,799, filed on Oct. 3, 2018, now Pat. No. 10,740,354, which is a continuation of application No. 14/877,669, filed on Oct. 7, 2015, now Pat. No. 10,198,494, which is a continuation-in-part of application No. 12/227,451, filed as application No. PCT/AU2007/000684 on May 18, 2007, now abandoned.

(56) References Cited

U.S. PATENT DOCUMENTS

| | | | | |
|---|---|---|---|---|
| 7,379,781 B2* | 5/2008 | Treichler | ............ | G06Q 10/087 705/28 |
| 7,537,153 B2* | 5/2009 | Hurwitz | ............... | G06Q 20/203 705/28 |
| 7,613,628 B2 | 11/2009 | Ariff et al. | | |
| 7,613,629 B2* | 11/2009 | Antonucci | ......... | G06Q 30/0613 705/26.1 |
| 7,734,495 B2* | 6/2010 | Klaubauf | ......... | G06Q 10/06315 705/7.33 |
| 7,912,748 B1* | 3/2011 | Rosenberg | ........... | G06Q 10/087 705/7.29 |
| 8,214,238 B1* | 7/2012 | Fairfield | ............ | G06Q 30/0203 705/7.29 |
| 8,355,944 B2* | 1/2013 | Young | .................. | G06Q 10/087 705/28 |
| 8,473,380 B2* | 6/2013 | Thomas | ................. | G06Q 40/00 705/40 |
| 8,527,371 B2* | 9/2013 | Aoyama | .......... | G06Q 10/06315 705/28 |
| 9,280,591 B1* | 3/2016 | Kharatishvili | .......... | G06F 16/27 |
| 9,430,541 B1* | 8/2016 | Johnson | .................. | G06F 16/27 |
| 2002/0116281 A1* | 8/2002 | Costello | ............... | G06Q 10/087 705/26.8 |
| 2002/0143587 A1* | 10/2002 | Champernowne | | G06F 16/2455 705/5 |
| 2002/0174000 A1* | 11/2002 | Katz | ....................... | G06Q 10/10 705/7.26 |
| 2002/0174103 A1* | 11/2002 | Hsiao | ....................... | G06F 16/10 |
| 2003/0033179 A1* | 2/2003 | Katz | ................. | G06Q 10/0631 705/7.41 |
| 2003/0033205 A1* | 2/2003 | Nowers | ................. | G06Q 30/06 705/26.8 |
| 2003/0036929 A1* | 2/2003 | Vaughan | ................. | G06Q 30/02 705/5 |
| 2003/0036981 A1* | 2/2003 | Vaughan | .............. | G06Q 10/087 705/28 |
| 2003/0088616 A1* | 5/2003 | Etessami | ................. | G06Q 30/02 709/203 |
| 2003/0105684 A1* | 6/2003 | Dunn | ................... | G06Q 10/087 705/28 |
| 2003/0139949 A1* | 7/2003 | Jafri | ....................... | G06Q 30/02 705/5 |
| 2003/0144867 A1* | 7/2003 | Campbell | .............. | G06Q 10/02 705/5 |
| 2003/0200006 A1* | 10/2003 | Penkar | ................. | G06Q 10/087 700/214 |
| 2004/0153359 A1* | 8/2004 | Ho | ..................... | G06Q 30/0202 705/7.29 |
| 2004/0167809 A1* | 8/2004 | Jafri | ....................... | G06Q 10/02 705/5 |
| 2004/0193457 A1* | 9/2004 | Shogren | ................. | G06Q 10/02 705/5 |
| 2004/0230503 A1* | 11/2004 | Lucas | .................... | G06Q 10/06 705/28 |
| 2004/0260581 A1* | 12/2004 | Baranowski | .......... | G06Q 40/02 705/5 |
| 2005/0004818 A1* | 1/2005 | Liman | .................... | G06Q 10/02 705/28 |
| 2005/0060270 A1* | 3/2005 | Ramakrishnan | ... | G06Q 30/0207 705/400 |
| 2005/0086086 A1* | 4/2005 | Mack | ...................... | G06Q 10/02 705/5 |
| 2005/0144052 A1* | 6/2005 | Harding | ................. | G06Q 30/06 705/26.1 |
| 2006/0200370 A1* | 9/2006 | Ratliff | .................... | G06Q 10/02 705/5 |
| 2007/0143155 A1* | 6/2007 | Whitsett | ................ | G06Q 10/02 705/5 |
| 2007/0208630 A1* | 9/2007 | Chatter | .................. | G06Q 40/04 705/26.8 |
| 2008/0086449 A1* | 4/2008 | Matsuzawa | ......... | G06F 16/2379 |
| 2011/0231363 A1* | 9/2011 | Rathod | .................... | G06F 8/65 707/E17.005 |
| 2012/0078847 A1* | 3/2012 | Bryant | ................ | G06F 16/2365 707/E17.007 |
| 2014/0082660 A1* | 3/2014 | Zhang | .............. | H04N 21/25866 725/32 |

FOREIGN PATENT DOCUMENTS

| | | |
|---|---|---|
| JP | 2001350826 | 12/2001 |
| WO | 2001082135 | 11/2001 |
| WO | 2001084278 | 11/2001 |
| WO | 03048893 | 6/2003 |
| WO | 2001067356 | 9/2003 |
| WO | 03094068 | 11/2003 |
| WO | 2005001615 | 1/2005 |
| WO | 2005010675 | 2/2005 |

OTHER PUBLICATIONS

Kimes, Sheryl E., "Yield Management: A Tool for Capacity-Considered Service Firms," Journal of Operations Management, vol. 8, issue 4, pp. 348-363, Oct. 1989.

Netessine, Serguei, et al., "Centralized and Competitive Inventory Models with Demand Substitution," Institute for Operations Research and the Management Sciences, Operations Research 51(2):329-335, https://doi.org/10.1287/opre.51.2.329.12788, 2003.

PCT, International Preliminary Report on Patentability in International Application No. PCT/AU2007/000684 dated Nov. 18, 2008.

PCT, International Search Report and Written Opinion in International Application No. PCT/AU2007/000684 dated Aug. 3, 2007.

* cited by examiner

COMPUTER-IMPLEMENTED MANAGEMENT OF BOOKINGS FOR TRANSPORTATION SERVICES

RELATED APPLICATIONS

The present application is a continuation of U.S. patent application Ser. No. 16/924,395, filed on Jul. 9, 2020, which is a continuation of U.S. patent application Ser. No. 16/150,799, filed on Oct. 3, 2018, which is a continuation of U.S. patent application Ser. No. 14/877,669, filed on Oct. 7, 2015, which is Continuation-In-Part patent application of U.S. patent application Ser. No. 12/227,451, filed on Dec. 18, 2009, which is a national stage of international patent application no. PCT/AU2007/000684, filed on May 18, 2007, which claims the benefit of priority to Australian provisional patent application 2006902685, filed on May 18, 2006, the contents of all of which are hereby incorporated by reference in their entireties.

BACKGROUND

1. Field

This disclosure generally relates to the field of computing systems.

2. General Background

A particular problem exists when selling inventory, such as travel services including accommodation allotments, flights and other transport services. The problem is a result of the manner in which such inventory is allocated to various re-sellers, referred to as distribution channels ("Channels"), which can be ad hoc and thus inefficient.

The particular problem is that the market has forced vendors to commit physical inventory to particular Channels in a relatively ad hoc manner. Furthermore, where the inventory is accommodation which needs to be sold between particular dates, any attempt to achieve efficiency by selecting the most efficient Channels can become extremely difficult. In particular, most independent hotels and accommodation properties lack the resources to have members of staff dedicated to managing allocations to Channels. It is practically impossible for them to manage this inventory in multiple Channels while still maintaining their businesses.

SUMMARY

In one aspect of the disclosure, a computer-implemented method of managing online bookings for transportation services inventory is provided. The computer-implemented method links, via a computerized network, each item in the transportation services inventory with one of a plurality of online distributions channels by allocating the item to the respective online distribution channel. Furthermore, the computer-implemented method receives, from each of a plurality of online distribution channels in real time via the computerized network, sale data pertaining to the online bookings for the items in the transportation services inventory allocated to the respective online distribution channel. The computer-implemented method processes the sale data by carrying out calculations to obtain a performance rating for each of the respective online distribution channels. Additionally, the computer-implemented method queries whether the performance rating of each of the respective online distribution channels is greater than a performance rating of other online distribution channels. Based on the query being answered in the affirmative, the computer-implemented method carries out at least one of the following: adjusting, via the computerized network, a price of the items in the transportation services inventory allocated to each of the linked online distribution channels; and modifying, via the computerized network, the linkage of the items in the transportation services inventory to the respective online distribution channels by re-allocating the items in the transportation services inventory to or from said each of the online respective distribution channels from or to the other online distribution channels.

In another aspect of the disclosure, a non-transitory computer-readable storage medium stores computer instructions to be implemented on at least one computing device including at least one processor. The computer instructions when executed by the at least one processor cause the at least one computing device to link, via a computerized network, each item in transportation services inventory with one of a plurality of online distributions channels by allocating the item to the respective online distribution channel. Furthermore, the computer instructions when executed by the at least one processor cause the at least one computing device to receive, from each of a plurality of online distribution channels in real time via the computerized network, sale data pertaining to online bookings for the items in the transportation services inventory allocated to the respective online distribution channel. Additionally, the computer instructions when executed by the at least one processor cause the at least one computing device to process the sale data by carrying out calculations to obtain a performance rating for each of the respective online distribution channels. The computer instructions when executed by the at least one processor also cause the at least one computing device to query whether the performance rating of each of the respective online distribution channels is greater than a performance rating of other online distribution channels. Based on the query being answered in the affirmative, carrying out at least one of the following: adjust, via the computerized network, a price of the items in the transportation services inventory allocated to each of the linked online distribution channels; and modify, via the computerized network, the linkage of the items in the transportation services inventory to the respective online distribution channels by re-allocating the items in the transportation services inventory to or from said each of the online respective distribution channels from or to the other online distribution channels.

In yet another aspect of the disclosure, a computer service is provided. The computing server manages online bookings for transportation services inventory. In particular, the computing server has a memory device. The computing server also has at least one processor configured to perform a method for managing the online bookings for the transportation services inventory. The method includes linking, via a computerized network, each item in the transportation services inventory with one of a plurality of online distributions channels by allocating the item to the respective online distribution channel. Furthermore, the method includes receiving, from each of a plurality of online distribution channels in real time via the computerized network, sale data pertaining to the online bookings for the items in the transportation services inventory allocated to the respective online distribution channel. Additionally, the method includes processing the sale data by carrying out calculations to obtain a performance rating for each of the respective online distribution channels. The method also includes querying whether the performance rating of each of the respective online distribution channels is greater than a performance rating of other online distribution channels. Based on the query being answered in the affirmative, carrying out at least one of the following: adjusting, via the computerized network, a price of the items in the transportation services inventory allocated to each of the linked online distribution channels; and modifying, via the computerized network, the linkage of the items in the transportation services inventory to the respective online distribution channels by re-allocating the items in the transportation services inventory to or from said each of the online respective distribution channels from or to the other online distribution channels.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

It will be appreciated that efficient selection of Channels for such inventory can allow vendors to achieve a selling price that corresponds with demand for the inventory in the Channels. In this way, an optimum price for, and supply of the inventory in each Channel could be achieved with such correct selection.

While this invention is intended to cover a wide variety of inventory-types, the travel and accommodation industries, in particular, would benefit greatly from efficient allocations of inventory to various Channels. A primary reason for this is that the traveling public is now able to book and pay online for practically all of its travel and accommodation needs via various online travel/accommodation reseller portals and agencies, which can be regarded as Channels. The online reseller market is particularly large in this field and the various Channels have the potential to be extremely successful.

Figure 1:
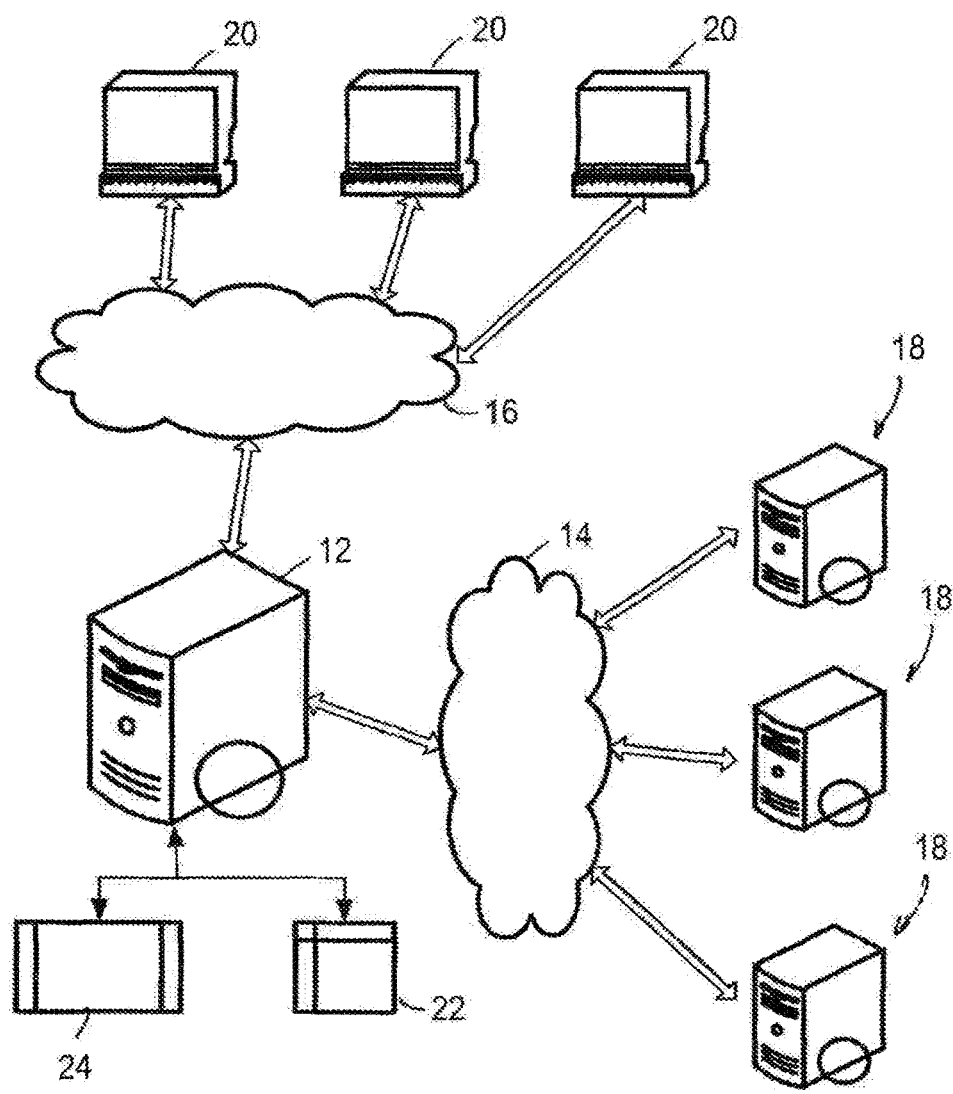
FIG. 1 shows a schematic view of an exemplary embodiment of a system for managing the allocation of inventory.

In FIG. 1, reference numeral 10 broadly illustrates an exemplary embodiment of a system for managing inventory allocated to respective re-sellers.

In the following description, reference is made to the inventory items in the form of accommodation allotments and in further descriptions as Rooms. It is to be understood that such accommodation allotments or Rooms are allotments of property for the purposes of short term rental, such as holiday apartments, hotel rooms, etc.

The system 10 includes a data processing apparatus in the form of a computer 12 that is connectable to a network. In this case, the network can be the Internet indicated at 14 or a private network indicated at 16. It will readily be appreciated that the private network 16 can be a virtual private network (VPN) which could form part of the World Wide Web indicated at 14.

The computer 12 is programmed or configured with to receive data relating to accommodation allotments allocated to respective re-sellers stored on servers that are referred to as distribution channels or channels, indicated schematically at 18, via the World Wide Web 14.

The computer 12 is configured to process the data to obtain data relating to sales performance in each channel 18 and referred to as performance data that provides an indicator of the performance in the sales channel. On receipt of the performance data, the computer is configured to adjust characteristics or parameters relating to inventory allocated to respective channels 18 depending on the performance data, and/or re-allocate inventory in respective channels 18 to other channels 18.

The computer 12 is configured to store data representing inventory that is required to be sold on line by third party on line resellers using the channels 18. The system 10 allows a vendor of the inventory, in the form of a member or subscriber, indicated at 20, to place all or part of their inventory required to be sold online in a database 22 of the computer 12. Thus, the computer 12 is configured so that it generates a database 22 and uses a subroutine 24 that can be stored in a non-transitory, computer-readable medium, to manipulate the data representing the inventory, as described below.

In particular, the computer 12 is configured to associate the channels 18 with inventory data in the database 22. The computer 12 receives data relating to the transfer of inventory in the form of data relating to one or more of the following: sale price of each item of inventory, rate of commission and number of items sold over a pre-determined length of time. The subroutine 24 is configured to calculate a rate index, in the form of an indicator, for each channel 18 in the form of a ratio of the number of items of inventory transferred in a pre-determined time ("S") to the number of inventory items available ("A") in that distribution channel 18. That gives (S/A) or (S:A) that can be used as an indicator for whether or not the computer 12 is required to make certain decisions.

The computer 12 is configured to calculate a performance rating, which is also an indicator, for each channel 18. The performance rating can reflect a determination of whether or not supply of inventory to each channel 18 exceeds demand or vice versa per channel 18.

By using the performance rating and the calculated index, S/A, the subroutine 24 can calculate the number of inventory items, in the form of a distribution value, to allocate or distribute to one or more particular channels 18, and the price at which those items can be sold to maximize a profit for the items.

The subroutine 24 is configured so that, when executed by the computer 12, the computer can set a minimum price of items and can adjust the price up from or back to that minimum based on the performance rating of the channel 18 in which the relevant inventory is placed.

Furthermore, the subroutine 24 is configured also so that, when executed by the computer 12, the computer increases the price in channels with a relatively high outward transfer rate and high costs, such as commissions, when compared with other channels, so that their performance rating can be equal to or higher than other channels 18 with lower outward transfer rates and costs. It follows that the system 10 can be used to maximize profit on a range of competing channels. It follows also that a rate at which a particular channel is selling compared to its performance rating is directly proportional to a surplus of supply and the outward transfer rate in that channel.

It is to be understood that supply of inventory items and extent of commission can control the rate at which inventory is sold in each channel 18, at a basic level. It follows that if a shortage of supply should occur, a price of inventory in all the channels 18 will increase. However, in the event that there is over-supply, the price will decrease relative to the performance rating.

It follows that the vendors or an administrator of the system of the invention can set a rate of change that could be used to increase or decrease a price at which an inventory item is sold. An example of a suitable rate is 10%. In a particular example, performance of the channels 18 will be calculated per hour, i.e. recurrently, and related to previous statistical analysis of a particular targeted date range. That analysis can provide a tool for adjusting the rate upwardly or downwardly. In other words, the performance of the channels is calculated recurrently.

Figure 2:
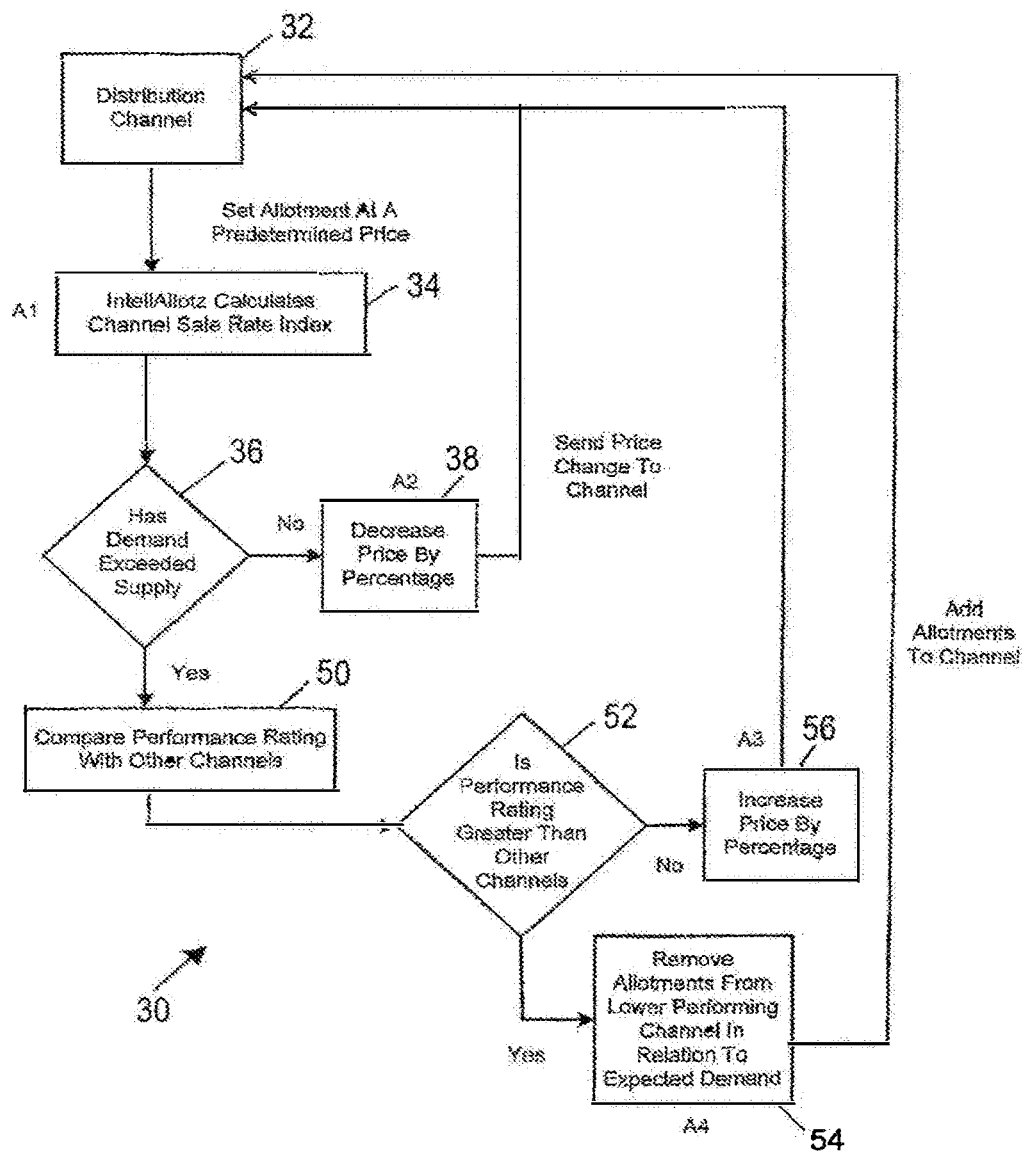
FIG. 2 shows a flowchart indicating an exemplary embodiment of a method for managing the allocation of inventory.

In FIG. 2, reference numeral 30 generally indicates a broad overview of the operation of the system 10.

Reference numeral 32 indicates any channel 18 associated with a user-selected third party re-seller that stocks real-time inventory availabilities or allocations that are represented by values in database fields of computers associated with the channels 18. The subroutine 24 is configured dynamically to allocate or reallocate or update or query inventory allocations associated with the channel 32. This can be done, for example, using an XML standard.

The operation 30 is initiated with inventory being transferred out from the channel 32 at a predetermined price. At 34, the subroutine 24 calculates the rate index, as explained above. In particular, the subroutine 24 is configured to calculate the rate index by calculating an amount sold in a predetermined period of time divided by the amount allocated to the channel 32 (NS). The value returned is then multiplied by 100 to get a percentage. The percentage is used as a parameter or indicator by the subroutine 24 to calculate whether or not particular channels are to be allocated inventory. The parameter is used in a function to make that calculation. It will also be appreciated that channels could be performing equally well, even though the value (A/S) is higher for one than the other. This would occur where one of the channels has been allocated more inventory than the other.

In that case, imaginary inventory allocations are generated in order to provide the necessary equalization in the form of initial distribution conditions. Alternatively, a suitable statistical equation (described in more detail below) can be applied using a comparison to average values for NS over the channels being compared. The statistical equation can use a Standard Deviation parameter to adjust for the different starting amounts or initial distribution conditions.

At 36, the subroutine 24 queries whether or not demand has exceeded supply in the channel 32. If a negative answer is returned, the subroutine decreases the price by a percentage, such as about 10%, at 38 and updates data representing the channel 32. In other words, the steps taken by the computer executing the subroutine are contingent on the query carried out by the subroutine.

Figure 3:
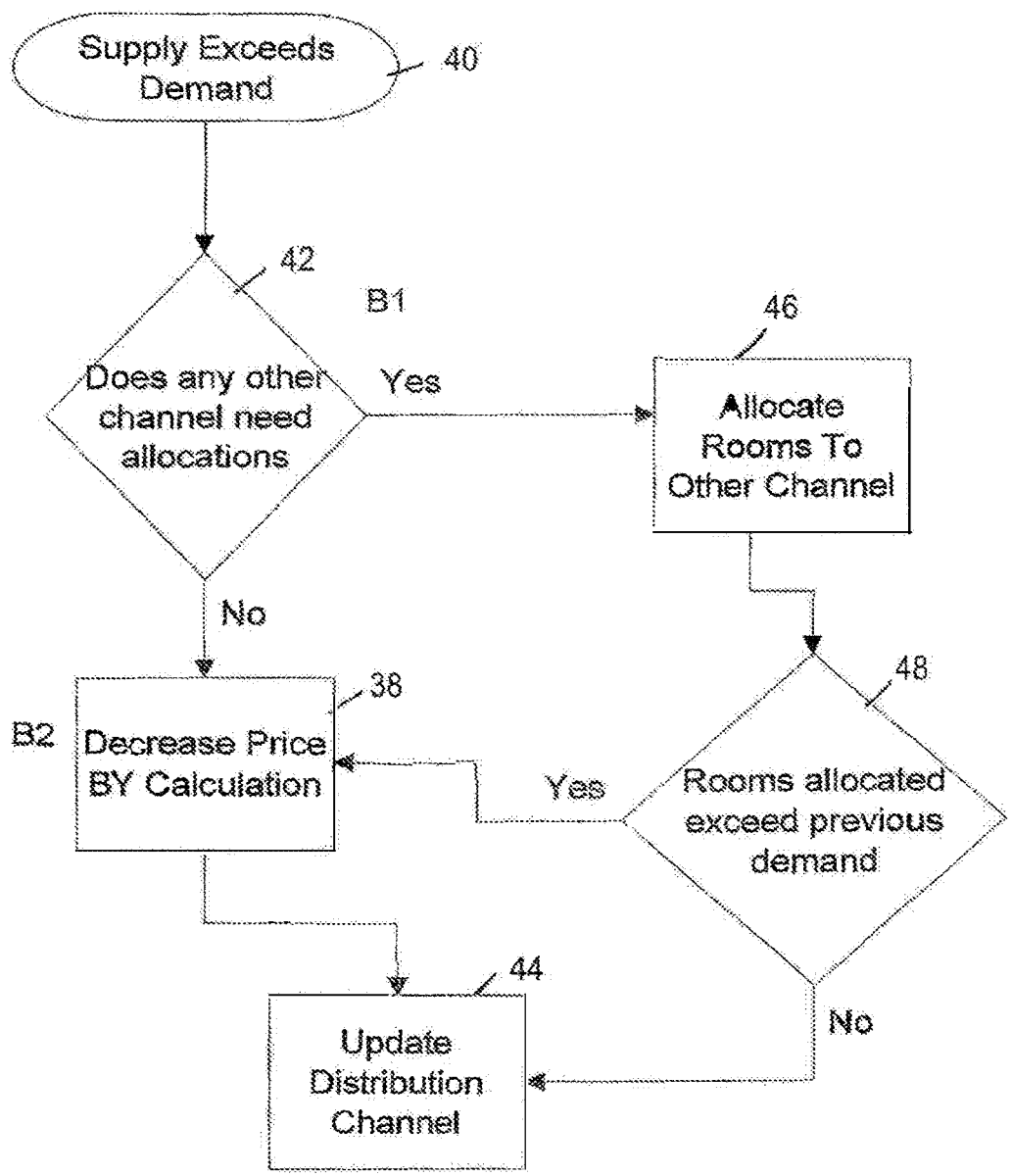
FIG. 3 shows a flowchart indicating an exemplary embodiment of a method for managing the allocation of inventory when supply of that inventory exceeds demand for that inventory.

This step is more clearly shown in FIG. 3. If that supply exceeds demand at 40, then the subroutine 24 queries at 42 whether any other channel requires inventory. If a negative answer is returned, then the price, in the form of a non-contingent value, can be decreased as at 38. Once the price has been decreased, the subroutine 24 updates the data relating to the channel 32, at 44.

If the query at 42 is positive, then the subroutine 24 allocates inventory, at 46, to another channel by distributing a fresh distribution value to said another channel. Subsequently, the subroutine 24 queries whether or not the inventory allocated to the other channel exceeds a previous demand at 48. If that query returns a positive, then the subroutine 24 carries out the step of decreasing the price, at 38. If the query returns a negative, then the channel 32 is updated, as at 44.

The subroutine 24 includes a calculation at 38 that involves what is known as "Minimum Rack Rate", a "Current Rate" and a "Surplus Percentage". As is known in the accommodation industry, for example, the term "rack rate" is used to refer to a fixed rate for a room. It follows that a Minimum Rack Rate would be a minimum price for a particular accommodation or room allocation. In this case "room" is interchangeable with "item" for the sake of understanding. The current rate, or price of a room per night, for example, would be a rate at a particular snap shot in time. The Surplus Percentage would indicate a percentage of surplus room allocations in a particular distribution channel.

The step of decreasing a price by the calculation at 38 is effectively a step of decreasing the performance rating of that particular channel. Accordingly, in this example, the subroutine 24 adjusts the performance rating down by 10%. Thus, if the channel 32 had a performance rating of X rooms selling at $Y each with a commission of $Z and the performance rating is to be reduced by 10%, then the following calculation is carried out by the subroutine 24 to obtain the rate (R): $0.9Y+Z=R$.

If the Minimum Rack Rate was below the R, then $R would be the new sale price per room. Otherwise, the minimum rack rate would be the price. It is thus to be appreciated that the subroutine 24 would not continually lower the prices of rooms below a predetermined minimum, which could be represented as minimum non-contingent value.

Reverting back now to FIG. 2, if the query at 36 returns a positive, then the computer 12 compares the performance rating, or control indicator, of the channel 32 with control indicators or performance ratings of other channels to provide a group control indicator relating to the group of channels. As set out earlier, the performance rating can be in the form of a number of parameters. For example, it could be related to a surplus or deficit percentage related to supply and demand of particular inventory items. At 52, the subroutine 24 queries whether or not the performance rating of the channel 32 is greater than the other channels. This can be done using the "imaginary rooms" or the statistical analysis mentioned above.

If the query returns a positive, then the computer 12 removes inventory items at 54 from the lower performing channels and adds them to the channel 32 by refreshing distribution values. Alternatively, if the query at 52 returns a negative result, then the computer 12 serves to increase the inventory item price at 56 by a particular percentage. In this example, the percentage is 10%.

Using a calculation similar to the one used for decreasing the price, if a channel with a performance rate of X allotments selling at $Y with a commission of $Z is increased by 10% the following calculation would be used to obtain the rate (R): $1.1Y+Z=R$.

As can be seen in FIG. 2, once the steps at 54 and 56 are completed, the channel 32 is updated or refreshed.

Two methods have been conceived for receiving the data from respective channels 18. These are referred to as the "real-time" and "request-based" methods.

In this example, all calculations are done hourly per item or allocation and each calculation per item is started apart from the others' calculations. In other words, the times at which calculations are made for respective items are temporally independent. It follows that item A calculations would, for example, start at 12:00 and item B calculations would, for example, start at 12:01 and so on. The computer 12 is configured such that the interval is decided by the amount of items and channels 18 on which the items reside and where the channels 18 communicate with the computer 12 via the World Wide Web 14.

Channels that report values in real-time back to the computer 12 store their data in the database 22 until it is called or polled by the subroutine 24. On the other hand, request-based channels are polled by the subroutine 24 before the calculations are made to determine fresh values.

Figure 4:
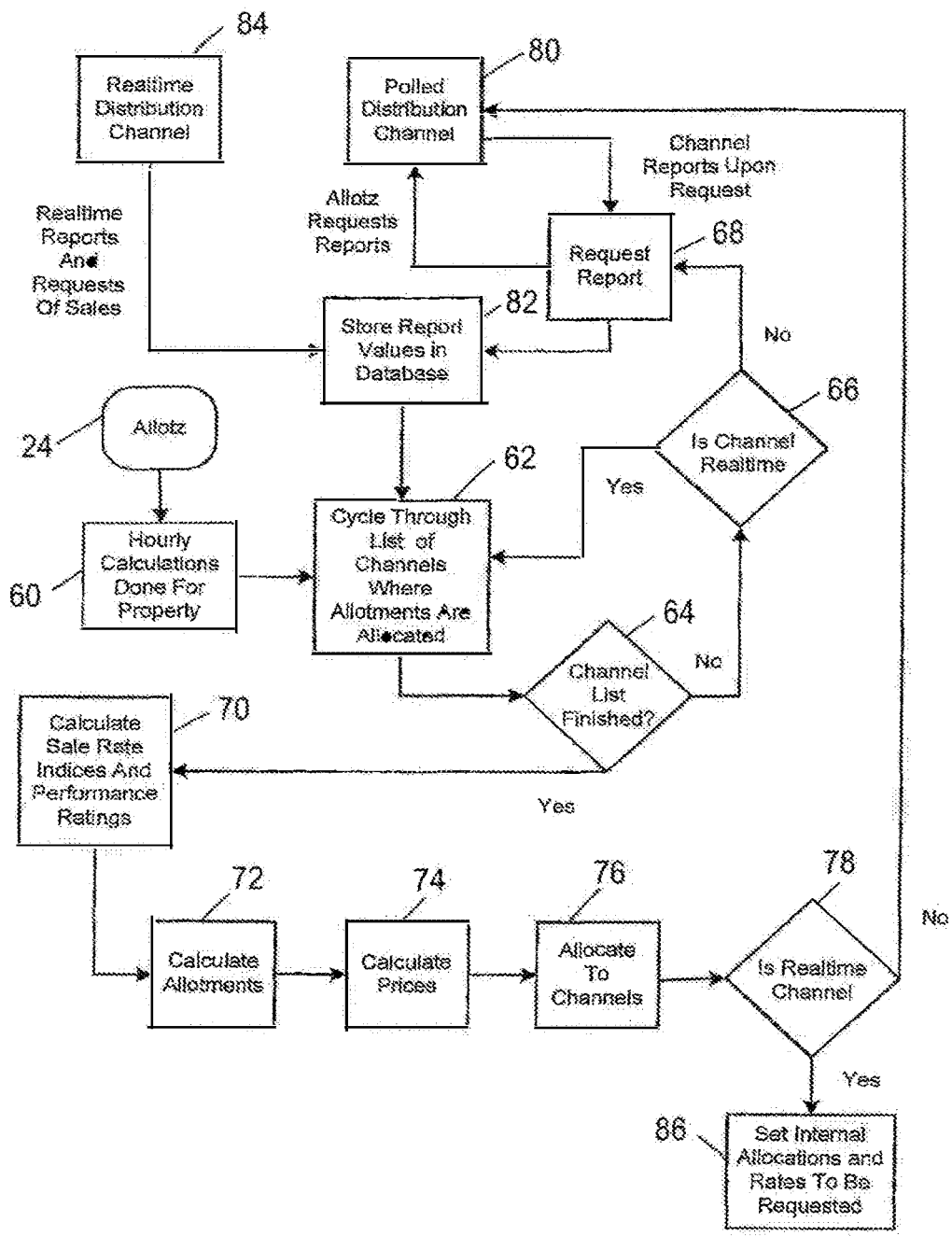
FIG. 4 shows a flowchart indicating an exemplary embodiment of a method for collecting data relating to different re-sellers.

An example of the manner in which the data is collected from the channels is shown in FIG. 4. In FIG. 4, the computer 12, executing the subroutine 24, carries out hourly calculations at 60 for each item in the various distribution channels. At 62, the computer 12 cycles through a list of channels where the items are stored in the database 22.

The subroutine 24 then queries or determines, at 64, for each channel, whether or not the list of channels has been cycled through. In the event that a negative response is returned, the subroutine 24 queries whether or not the respective channel is "real-time". In the event that the response is negative, the subroutine 24 requests a report at 68 from the relevant server.

On the other hand, if the query at 66 is positive, the subroutine 24 continues to cycle through the list of channels at 62.

If the query or determination at 64 is positive, the subroutine 24 carries out various calculations to obtain the indicators in the form of sale rate indices and performance rating, at 70, as described earlier. At 72, a number of allotments or items to be allocated are calculated. At 74, the subroutine 24 calculates the prices for those allotments. At 76, the subroutine 24 allocates the allotments to various channels, in accordance with the tests and parameters described with reference to FIGS. 2 and 3. At 78, the subroutine 24 queries whether or not the respective channel is a real-time channel. In the event that this query returns a negative result, the subroutine 24 polls the relevant server of the channel at 80. The server for the channel then transmits the report to the database 22. The subroutine 24 stores the report values in the database 22 at 82.

At 84 there is schematically indicated a real-time channel. The channel 84 provides, on a regular basis, real-time reports and requests of sales to the database 22 at 82.

In the event that the query at 78 returns a positive, the subroutine 24 serves to re-set allocations to various Channels 18 and the respective prices at 86.

Embodiment for Application Over a Predetermined Period

A further embodiment is now described with reference to an algorithm defined by the subroutine 24. The algorithm can be applied in the framework of the system 10, described above. However, this algorithm is an alternative to the algorithmic process described above, while still falling within the broader scope of the preceding material.

The description is with reference to the operation of the algorithm over a 5 day period. Reference is made to Tables 1 to 5 which appear at the end of the description of this embodiment. It is to be appreciated that the embodiment can readily be applied to longer or shorter periods without technical difficulty.

As is generally known, tables are represented within computer systems as relational databases. In this specification, the word "table" is used to facilitate an understanding of the embodiments described herein.

In this example, it is assumed that there are five channels operating servers. This example takes into account that two of the channels have negotiated blocks of 50 allotments, something which is conventional in the field. The negotiated blocks are indicated by the row entitled "blocked allocation" in the tables. It is to be understood that since those allotment allocations have been negotiated, it is not possible for the system 10 to act freely on those allocations.

For ease of reference only, the allotments are referred to as "Rooms".

It should be noted that the Rooms are those associated with a particular property (Property). The Property is to be understood as a characteristic of the Rooms that makes comparison between the Rooms meaningful. For example, the Rooms could be sourced from a common hotel franchise or from a particular geographical area or from a particular star rating etc. This could be given a value for use in a function to be applied to values in database fields of the various channels.

Set out below is a list of Notations used with their meanings in the Tables and in the following description:

| Notation | Definition |
|---|---|
| A | Number of Rooms Allotted |
| S | Number of Rooms Sold |
| I | An indicator variable to depict whether a Channel has a negotiated blocked allocation |
| T | Total Number of Rooms Sold |
| P | Proportion of Rooms Sold |
| NS_CR | Number of Rooms that are Not sold and CAN be redistributed |
| NS_CNR | Number Rooms that are Not sold and CANNOT be redistributed |
| TNS | Total Number of Rooms Not Sold |
| NAA | New Allocation Amount |
| Aadj | Allocation Adjustment Amount |
| FAA | Final Allocation Amount |

| Notation | Definition |
|---|---|
| RA | Redistribution Adjustment from Unblocked Rooms |
| FAA-UB | Final Allocation Amount After Unblocking |
| Sum_S | Total Rooms Sold Overall (per stated time period) |
| Sum_NSR | Total Rooms Not Sold (per time period) that CAN be redistributed |

If a blocked allocation of Rooms has been negotiated (i.e. it is not possible to transfer those Rooms from one channel to another), wholesalers generally release unsold Rooms back to the associated Property, usually 7 days from the end of a negotiated time-period.

It is thus necessary to monitor each of the Rooms within each step of the algorithm to ensure that any adjustments are made using only those Rooms that are free to be sold through channels and transferred from one channel to another. The reason is that the blocked Rooms can be considered as sold.

This five day example assumes that on day four any Rooms obtained in a previously negotiated blocked sale that are not sold are then released into a general domain for selling in any of the other channels to sell, and re-allocated accordingly. This reallocation will be a function of a channel's relative performance in the market.

Day 4 is therefore analogous to the start of a final 7-day period when rooms are released to the general domain as mentioned above.

Furthermore, it is assumed that adjustments are made only once a day.

For each channel, the number of Rooms sold is recorded and a total is calculated in the final column. In order to obtain a measure of how well a re-seller is performing in the market, a ratio between the Rooms sold per Channel and the total number of Rooms sold at each time point is calculated to provide a suitable indicator. This provides a measure of how well a channel is selling the Rooms for a predetermined time period. This is then used to ascertain any price adjustments that should be made for the associated channel.

For j=1, n, where j represents the Channel Number, the ratio is defined by $P_j = S_j / \sum_{j=1}^{n} S_j$, $S_j$ being the number sold per Channel. In this case, n=5.

In order to evaluate any redistribution of room allocations (when necessary), it is also necessary to record the number of rooms that are not sold. In general, if there are some channels that have negotiated room blocks for a given room type in a given property (as is the case in this example), then this amount needs to be further broken down into a count of rooms that can be redistributed to other channels and a count of rooms that cannot be redistributed to other channels.

However, it is assumed that if a Room is sold from a channel with a negotiated allocation, this will be deducted from their initial block of Rooms rather than any redistributed allocation that may occur at a stage when a channel is depleted of all Rooms. This will be discussed in more detail below.

In order to set up the algorithm in the subroutine 24, Rooms are artificially allocated to each channel depending on each P calculated above. This allocation is considered to be artificial since the main consideration is not whether a channel is selling a large proportion of its Rooms, only that it is selling a larger proportion of Rooms relative to its competitors in that Property.

However, it is necessary for the number of Rooms to be factored into the algorithm used by the subroutine 24. The reason is that an accommodation provider can choose to allocate, at the outset, a block of Rooms (through negotiation based on a business decision) to a Channel or even select Channels through which to sell Rooms. In the associated relational database, these could be set up as initial distribution conditions.

In any event, the following example illustrates why the number of Rooms should not play a role in price adjustments.

Assume there are only two Channels for Rooms in a particular Property. Assume that Channel 1 has 20 Rooms and Channel 2 has 10 Rooms and they each sell 5 Rooms. Comparatively, they are performing equally well, but if the price changes are based on a contingent value, in this example, the ratio of sold Rooms to allocated Rooms, then Channel 1 appears to be doing worse and its prices, which are non-contingent values, would be required to drop compared to Channel 2 that appears to be doing better and its prices would invariably go up.

Consequently, in order to calculate any adjustment of non-contingent values, in this example price adjustments, the proportion of total Rooms sold by a channel is compared to the average proportion over all channels. This is done through a percentage change (PC) calculation relative to the average proportion of Rooms sold. Furthermore, a scale is derived to project these percentage changes onto a comparative measure, which is done in the following way: $Z_j = PC_j - \text{Mean}(PC)/(\text{St.Dev}(PC/\sqrt{n}))$.

Again, the value for n should be replaced with 5 since five channels are being considered. Using this, it is possible to apply the following adjustments:

| Z score | Adjustment to price |
|---|---|
| Greater than 3 | Increase by 5% |
| Between 2 and 3 | Increase by 2% |
| Between 1 and 2 | Increase by 1% |
| Between −1 and 1 | No change |
| Between −2 and −1 | Decrease by 1% |
| Between −3 and −2 | Decrease by 2% |
| Greater than −3 | Decrease by 5% |

The description given in the above paragraphs covers the general issues and calculations required to adjust the price of a Room for a respective Property.

The following paragraphs go into more detail regarding each step to be carried out and the order in which each of the steps must proceed.

Referring to the Tables mentioned earlier, Tables 1 to 4 are named "Base Case" and represent the situation on each day respectively when a given channel that has no blocked Rooms is depleted of all of its inventory at the end of Day 1. Thus, a number of Rooms in the respective channels needs to be adjusted.

Tables 5 to 8 are named "Inventory Depleted before Unblock" and represent the situation on each day respectively when a channel is depleted of its Rooms on Day 2, prior to when its unsold Rooms in blocked channels are released for general distribution.

Tables 9 to 12 are named "Inventory Depleted after Unblock" and represent the situation when a channel is depleted of its Rooms after any Rooms that have not been sold during the blocked period are released (on Day 4).

Three steps are to be noted when the subroutine 24 is executed. There are an initial set of steps for a first time period or recurrence. These are described first. In a second and in subsequent time periods, a number of minor changes are applied depending on if and when Room numbers in respective channels need to be readjusted. These are described in turn. Thirdly, prior to the blocked Rooms being released to the general domain, a number of steps are required to adjust the number of Rooms in respective channels at the beginning of the next time period (i.e. at the beginning of Day 4 in this worked example).

Note that the notation used for logical statements in an Excel (such as If) are written below exactly as they would appear in an Excel spreadsheet, except that rather than using cell Identifiers (for example, A1), a description of what the cell contains, defined by the notation provided above, is given. It will be appreciated by those of ordinary skill in the field that an Excel spreadsheet is effectively a relational database. It is therefore to be appreciated that the following steps described with reference to an Excel spreadsheet can just as well be carried out with any number of relational database applications.

Initial steps to be carried out: Per channel, compute the following:

Per channel, compute the following:
1. Record Rooms Allotted (A) and Rooms Sold (S).
2. If (I=1, NS_CNR=A-S, 0).
3. If (I=0, NS_CR=A-S, 0).
4. T=A-S.

Steps 2 and 3 ensure that those Rooms not sold are recorded correctly as to whether they can be redistributed at a later stage or not.

Next, 5. Calculate Sum_S and Sum_NSR using the values from the previous 4 steps.

Per channel, calculate P as T/Sum_S. Compare each of the amounts obtained at part 6 to the average proportion sold per channel.

7. Compute the average of the P's.

Again, per channel, 8. Work out the percentage change (% C) of each P relative to the average P. Now, compute the average percentage change and the standard deviation of this percentage change (see equations above).

Using these values, per channel, 9. subtract the mean Percentage Change from each % C.

And, 10. Divide through by (Standard Deviation of the Percentage Change/Square Root (Number of channels)). This returns a Standardized Score for measuring each of the scores to each other and therefore adjusted according to the scales for Z provided above. Per channel, the subroutine 24 checks whether any Rooms need to be transferred to other channels. This will only be the case if the channel has sold all of its Rooms.

Therefore, 11. check to see if A>S. If so, then NAA=0 and there are still rooms left to sell for this channel. If A=S, then multiply the proportion of rooms sold for this channel (P) by Sum_NSR to get a value for NAA (this should only give a value for where A=S).

12. Compute any relevant adjustment of Room numbers for all other channels (Aadj) by multiplying NS_CR by each P.

13. Compute the FAA at the next time period by adding AAdj to NS_CNR.

Note that Steps 12 and 13 only need to be carried out if one of the channels has been depleted of Rooms. Furthermore, note that if a Room is transferred to another channel and if a channel has a Room block, it cannot have any Rooms taken away from it, but it is can be allocated more Rooms. However, this step is unavoidable since a transfer of Rooms is based on a ratio of Rooms sold per channel to all Rooms sold and this total will include those blocked channels and therefore cannot be ignored. However, any extra Rooms that are allocated to a blocked channel can be redistributed if another channel becomes depleted.

Subsequent Steps to be Carried Out

For further time periods, the following adjustments at steps 2 and 3 must be made per channel.

At step 2: If (1=1, NS_CNR=NS_CNR (Day 1) S (Day 2), 0). After the calculations for Day 1 have taken place initially, this becomes a count over each time period of how many Rooms from the original blocked count are available. In other words, this is carried out recurringly. Therefore, if (1=0), NS_CNR=0.

This next step ensures that if all of the Rooms from the block are sold (where it is assumed that if an accommodation provider has a blocked deal, then it will sell Rooms from that block first and then any other Rooms sold at a given time period will come out of its Rooms that CAN be redistributed, as mentioned above), and NS_CNR becomes negative in the step above, then this will not affect the calculation of the total Rooms not sold. The algorithm is capable of dealing with this. However, it means that the calculation for NS_CR must be altered so that the negative value does not affect totals that are otherwise correct.

Consequently, per channel, at step 3: If (NS_CNR>O, A-S-NS_CNR, A-S). Therefore, if NS_CNR is negative, the count of Rooms that have not yet been sold and that can be redistributed is simply (A-S) because all Rooms now are available to be redistributed. If NS_CNR is not negative, then the count of rooms that can be redistributed must be (A-S-NS_CNR) as there are still some available from the original blocked amount that cannot be classed as being able to be redistributed.

Note that in the initial loops (times when the algorithm is executed) performed by the subroutine using the algorithm, NS_CNR is unlikely to be negative because not many Rooms will be transferred and, therefore, each channel will keep selling Rooms from its initial allotted amount of Rooms.

However, it will be appreciated that a negative value for NS_CNR is possible since a blocked channel can be allocated more Rooms when a transfer occurs and therefore sell its original blocked amount of Rooms while still having some Rooms left over to sell. As such, this step needs to be included so as to ensure that all totals are correct for sold and not sold Rooms and consequently prices are adjusted correctly.

The Release of Unsold Blocked Rooms

Assume that at Day 4 in this artificial example, any Rooms not sold from a block can be redistributed for ALL channels to sell. Therefore, prior to Day 4, at Step 11 a redistribution of the newly available Rooms must be made to all channels, depending on how well they are currently performing in the market. Therefore, the following steps are carried out per channel.

At step 11 a new row is created that will convert any negative values of NS_CNR to zero. Recall that negative values in NS_CNR indicate that a Room sold has come from a count that CAN be redistributed rather than the blocked count. Next, calculate the total for this new row.

At step 12 the remaining Rooms that have not been sold by the blocked channels can now be redistributed to all of the channels depending on how well they are performing, measured through P. Therefore, multiply P by the total calculated in part 11 for each channel. This is defined as RA.

At step 13, the Final Allocation Adjustment after Unblocking (FAA_UB) is determined. This is equal to RA+NS_CR for each channel.

At step 14, in defining the new Room totals per channel, this new variable, FAA_UB will flow through into Day 4 to represent the new Room totals per channel. Note that after these blocked Rooms have been released, then the only total of Rooms not sold required is the absolute total per channel and not the breakdown into those that can be redistributed and those that cannot. Therefore, there are two less rows after Day 4 in the tables in Excel.

Three cases will now be described in more detail.

Three separate scenarios are described to consider a number of eventualities that are represented by the attached Tables.

Tables 1 to 4: Base Case

In this situation, the algorithm is configured so that only a channel that has no blocked Rooms can have its Rooms to sell depleted. This is a case where the only complication arises when the total number of Rooms to be reallocated changes from those that can be redistributed to a different term in the spreadsheet after any unblocked Rooms are released into the general domain.

Therefore, prior to Day 4, steps 11 to 13 remain as described above. However, after Day 4, when checking for whether any Room transfers are necessary steps 11 to 13 are altered as follows.

At step 11, check to see if A>S. If so, then NAA=0 and there are still Rooms left to sell for this Channel. If A=S, then multiply the proportion of Rooms sold per Channel (P) by TNS to get a value for NAA (only for where A=S).

At step 12, compute the FAA at the next time period for all other channels by multiplying TNS by each P.

Tables 9 to 12: Inventory Depleted after Unblock

In this situation, the algorithm is configured for the case when a previously blocked Channel is depleted after the blocked Channels have redistributed their allocations (if they had not sold all of their allocations). Therefore, after Day 4, when checking for whether any Room transfers are necessary, steps 11 and 12 are changed slightly as follows.

At step 11, check to see if A>S. If so, then NAA=0 and there are still Rooms left to sell for this channel. If A=S, then multiply the proportion of Rooms sold per channel (P) by TNS to get a value for NAA (only for where A=S).

At step 12, compute the FAA at the next time period for all other channels by multiplying TNS by each P.

Tables 5 to 9: Inventory Depleted Before Unblock

In this situation, the algorithm is configured for when a blocked channel is depleted of its Rooms before the blocked channels are required to redistribute their Rooms. Therefore, prior to Day 4, when checking for whether any Room transfers are necessary in steps 11 to 13, these are carried out in the same way as described in the initial step The algorithm is preferably configured to make adjustments once a day. That serves to inhibit frequent fluctuations in price, which could occur in potentially large jumps upwards and/or downwards if the algorithm is used to update the prices more than once a day.

The time of day can be selected to take advantage of yield management theories indicating when a buyer is more likely to make a purchase of a Room over the Internet.

However, the situation arising as a result of a channel selling all of its Rooms before re-adjustment would mean that the channel could not sell any more Rooms until any re-adjustment takes place at the specified time.

For this eventuality, a loop is fed in to the algorithm to allow immediate updating and reallocation when a channel sells all of its Rooms. Therefore, if S=A, then the algorithm updates immediately to reallocate some Rooms to that channel to maintain the efficacy of the algorithm.

The algorithm is also configured to accommodate a situation where another channel enters at any stage of a particular time-period. The algorithm incorporates a step that will allow for this to happen and each step in the algorithm can be generalized so that resulting calculations reflecting any new information entered as inputs are correct.

The invention is intended to cover an embodiment in which rather than using the number of Rooms sold to evaluate how a particular re-seller compares to its competitors, the total revenue generated out of the total amount of revenue for that time period is considered.

This can readily be implemented in the framework described in the above paragraphs, in the event that information was made available.

Furthermore, there is provided an embodiment in which instead of making comparisons of channels at time points, comparisons are made over a predetermined time period. Seven days would be an example.

Still further, the embodiment provides a valuable opportunity to process data for the purposes of developing an evaluation tool. That could be done by recording historical data, analyzing the data statistically and monitoring the progress of the algorithm and of the market in general. This would inevitably lead to changes in the process described above and likely deliver a more efficient tool.

A Further Example of a Calculation for Changing a Rate

The first calculation below determines the percentage of rooms booked, via the channel, out of rooms allocated to the channel for the property. This value is calculated for each day in a 30 day period assessed.

A=the total number of allotments given to the channel for the property per day

S=the number of total sold allotments via the channel for the property per day

Z1 to Z30=the percentage sold from a channel per day $Z1=(A/S)\times 100$ $Z2=(A/S)\times 100$

. . .

$Z29=(A/S)\times 100$ $Z30=(A/S)\times 100$

The second calculation below determines the average percentage of rooms sold over the entire 30 day period for that property via that channel.

M=Average percentage of rooms booked via that channel for the property over 30 days $M=(Z1+Z2 \ldots +Z29+Z30)/30$ The next calculation determines how each day's percentage of rooms sold compare against an average percentage of rooms sold over the whole month. This will return a positive or negative number.

R1 to R30=a positive or negative number showing how a day's trade compares against the monthly average of percentage of rooms sold.

$R1=(Z1-M)$ $R2=(Z2-M)$ $R3=(Z3-M)$ $R4=(Z4-M)$

. . .

$R5=(Z4-M)$ $R6=(Z4-M)$

The next calculation is designed to get the average number of rooms sold across all channels using an embodiment of the invention for each day in the 30 day period assessed.

In the case of a property distributing to three Channels (i.e Channel 1, Channel 2 and Channel 3) the formula is:

$C1 = (\text{Channel } 1-Z1 + \text{Channel } 2-Z1 + \text{Channel } 3-Z1)/3$ $C2 = (\text{Channel } 1-Z2 + \text{Channel } 2-Z2 + \text{Channel } 3-Z2)/3$

. . .

$C29 = (\text{Channel } 1-Z29 + \text{Channel } 2-Z29 + \text{Channel } 3-Z29)/3$ $C30 = (\text{Channel } 1-Z30 + \text{Channel } 2-Z30 + \text{Channel } 3-Z30)/3$ The final calculation is done to determine the number (average percentage sold with controlling factors) between −100 and 100. This calculation is done for each day in the 30 day period assessed. This value is used to increase or decrease the rate according to a ledger of thresholds that can readily be determined by the Property.

$N1 = (C1 + R1)/2$ $N2 = (C2 + R2)/2$

. . .

$N29 = (C4 + R4)/2$ $N30 = (C5 + R5)/2$

TABLE 1

BASE CASE
Day 1

| | | Channel | | | | | | | |
|---|---|---|---|---|---|---|---|---|---|
| | Notation | C1 | C2 | C3 | C4 | C5 | Total | Av | Dev |
| Blocked Allocation | I | 1 | 1 | 0 | 0 | 0 | | | |
| Rooms Allotted | A | 50 | 50 | 50 | 50 | 50 | 250 | | |
| Room Sold | S | 8 | 20 | 50 | 10 | 5 | 93 | | |
| Rooms Not Sold (that cannot be redistributed) | NS_CNR | 42 | 30 | 0 | 0 | 0 | 72 | | |
| Rooms Not Sold (that can be redistributed) | NS_CR | 0 | 0 | 0 | 40 | 45 | 85 | | |
| Total Rooms Not Sold | TNS | 42 | 30 | 0 | 40 | 45 | 157 | | |
| Rooms Sold per Channel/Total Rooms Sold (P)** | P | 0.086 | 0.2151 | 0.5376 | 0.1075 | 0.0538 | 1 | 0.2 | |
| Percentage Difference in (P)(relative to average) | | −57 | 7.55 | 168.8 | −46.25 | −73.1 | | −2.8422E−15 | 99.0986 |
| Scaled Value | Z | −1.29 | 0.17 | 3.81 | −1.04 | −1.65 | | | |
| New Allocation Amount | NAA | 0 | 0 | 46 | 0 | 0 | 46 | | |
| New Allocation Adjustment | Aadj | 7 | 18 | 46 | 9 | 5 | 85 | | |
| Final Allocation Amount | FAA | 49 | 48 | 46 | 9 | 5 | 157 | | |

TABLE 2

BASE CASE
Day 2

| | | Channel | | | | | |
|---|---|---|---|---|---|---|---|
| | | C1 | C2 | C3 | C4 | C5 | Total |
| Rooms Allotted | A | 49 | 48 | 46 | 9 | 5 | 157 |
| Room Sold | S | 5 | 20 | 4 | 4 | 2 | 35 |
| Rooms Not Sold (that cannot be redistributed) | NS_CNR | 37 | 10 | 0 | 0 | 0 | 47 |
| Rooms Not Sold (that can be redistributed) | NS_CR | 7 | 18 | 42 | 5 | 3 | 75 |
| Total Rooms Not Sold | TNS | 44 | 28 | 42 | 5 | 3 | 122 |
| Rooms Sold per Channel/Total Rooms Sold (P)** | P | 0.1429 | 0.5714 | 0.1143 | 0.1143 | 0.0571 | 1 | 0.2 |

TABLE 2-continued

BASE CASE
Day 2

| | | Channel | | | | | Total | |
| --- | --- | --- | --- | --- | --- | --- | --- | --- |
| | | C1 | C2 | C3 | C4 | C5 | | |
| Percentage Difference in (P) (relative to average) | % C | −28.55 | 185.7 | −42.85 | −42.85 | −71.45 | −5.6843E−15 | 104.973 |
| Scaled Value | Z | −0.64 | 4.19 | −0.97 | −0.97 | −1.61 | | |
| New Allocation Amount | NAA | 0 | 0 | 0 | 0 | 0 | 0 | |
| New Allocation Adjustment | Aadj | 0 | 0 | 0 | 0 | 0 | 0 | |
| Final Allocation Amount | FAA | 0 | 0 | 0 | 0 | 0 | 0 | |

TABLE 3

BASE CASE
Day 3

| | | Channel | | | | | Total | | |
| --- | --- | --- | --- | --- | --- | --- | --- | --- | --- |
| | | C1 | C2 | C3 | C4 | C5 | | | |
| Rooms Allotted | A | 44 | 28 | 42 | 5 | 3 | 122 | | |
| Room Sold | S | 10 | 4 | 2 | 2 | 2 | 20 | | |
| Rooms Not Sold (that cannot be redistributed) | NS_CNR | 27 | 6 | 0 | 0 | 0 | 33 | | |
| Indicator Variable for a negative number of rooms | | 27 | 6 | 0 | 0 | 0 | 33 | | |
| Rooms Not Sold (that can be redistributed) | NS_CR | 7 | 18 | 40 | 3 | 1 | 69 | | |
| Total Rooms Not Sold | TNS | 34 | 24 | 40 | 3 | 1 | 102 | | |
| Rooms Sold per Channel/Total Rooms Sold (P)** | P | 0.5 | 0.2 | 0.1 | 0.1 | 0.1 | 1 | 0.2 | |
| Percentage Difference in (P) (relative to average) | | 150 | 1.388E−14 | −50 | −50 | −50 | 1.42109E−14 | 86.6025 | |
| Scaled Value | Z | 3.38 | 0.00 | −1.13 | −1.13 | −1.13 | | | |
| New Allocation Amount | NAA | 0 | 0 | 0 | 0 | 0 | 0 | | |
| New Allocation Adjustment | Aadj | 0 | 0 | 0 | 0 | 0 | 0 | | |
| Final Allocation Amount | FAA | 0 | 0 | 0 | 0 | 0 | 0 | | |
| Redistribution adjustment from unblocked rooms | RA | 17 | 7 | 3 | 3 | 3 | 33 | | |
| Final Allocation Amount_After Unblocking | FAA_UB | 24 | 25 | 43 | 6 | 4 | 102 | | |

In this worked example, after this time point, blocked rooms have been redistributed

TABLE 4

BASE CASE

| | | Channel | | | | | Total | | |
|---|---|---|---|---|---|---|---|---|---|
| | | C1 | C2 | C3 | C4 | C5 | | | |
| Day 4 | | | | | | | | | |
| Rooms Allotted | A | 24 | 25 | 43 | 6 | 4 | 102 | | |
| Room Sold | S | 4 | 6 | 3 | 6 | 1 | 20 | | |
| Total Rooms Not Sold | TNS | 20 | 19 | 40 | 0 | 3 | 82 | | |
| Rooms Sold per Channel/Total Rooms Sold(P)** | P | 0.2 | 0.3 | 0.15 | 0.3 | 0.05 | 1 | 0.2 | |
| Percentage Difference in (P)(relative to average) | | 0 | 50 | −25 | 50 | −75 | | −8.5265E−15 | 53.033 |
| Scaled Value | Z | 0.00 | 1.13 | −0.56 | 1.13 | −1.69 | | | |
| New Allocation Amount | NAA | 0 | 0 | 0 | 25 | 0 | 25 | | |
| Final Allocation Amount | FAA | 16 | 25 | 12 | 25 | 4 | 82 | | |
| Day 5 | | | | | | | | | |
| Rooms Allotted | A | 16 | 25 | 12 | 25 | 4 | 82 | | |
| Room Sold | S | 10 | 0 | 2 | 2 | 1 | 15 | | |
| Total Rooms Not Sold | TNS | 6 | 25 | 10 | 23 | 3 | 67 | | |
| Rooms Sold per Channel/Total Rooms Sold(P)** | P | 0.6667 | 0 | 0.1333 | 0.1333 | 0.0667 | 1 | 0.2 | |
| Percentage Difference in (P)(relative to average) | | 233.35 | −100 | −33.35 | −33.35 | −66.65 | | 8.52651E−15 | 133.341 |
| Scaled Value | Z | 5.27 | −2.26 | −0.75 | −0.75 | −1.50 | | | |
| New Allocation Amount | NAA | 0 | 0 | 0 | 0 | 0 | 0 | | |
| New Allocation Adjustment | Aadj | 0 | 0 | 0 | 0 | 0 | 0 | | |
| | Would stop here in this example | | | | | | | | |

TABLE 5

INVENTORY DEPLETED BEFORE UNBLOCK
Day 1

| | Notation | Channel | | | | | Total | Av. | Dev |
|---|---|---|---|---|---|---|---|---|---|
| | | C1 | C2 | C3 | C4 | C5 | | | |
| Blocked Allocation | I | 1 | 1 | 0 | 0 | 0 | | | |
| Rooms Allotted | A | 50 | 50 | 50 | 50 | 50 | 250 | | |
| Room Sold | S | 8 | 20 | 8 | 10 | 5 | 51 | | |
| Rooms Not Sold(that cannot be redistributed) | NS_CNR | 42 | 30 | 0 | 0 | 0 | 72 | | |
| Rooms Not Sold(that can be redistributed) | NS_CR | 0 | 0 | 42 | 40 | 45 | 127 | | |
| Total Rooms NotSold | TNS | 42 | 30 | 42 | 40 | 45 | 199 | | |
| Rooms Sold per Channel/Total Rooms Sold (P)** | P | 0.1569 | 0.3922 | 0.1569 | 0.1961 | 0.098 | 1.0001 | 0.20002 | |
| Percentage Difference in (P) (relative to average) | | −21.557844 | 96.080392 | −21.557844 | −1.959804 | −51.0049 | | −1.3E−14 | 56.4939457 |
| Scaled Value | Z | −0.85 | 3.80 | −0.85 | −0.08 | −2.02 | | | |
| New Allocation Amount | NAA | 0 | 0 | 0 | 0 | 0 | 0 | | |

TABLE 5-continued

INVENTORY DEPLETED BEFORE UNBLOCK
Day 1

| | | Channel | | | | | | | |
|---|---|---|---|---|---|---|---|---|---|
| | Notation | C1 | C2 | C3 | C4 | C5 | Total | Av. | Dev |
| New Allocation Adjustment | Aadj | 0 | 0 | 0 | 0 | 0 | 0 | | |
| Final Allocation Amount | FAA | 0 | 0 | 0 | 0 | 0 | 0 | | |

TABLE 6

INVENTORY DEPLETED BEFORE UNBLOCK
Day 2

| | | Channel | | | | | |
|---|---|---|---|---|---|---|---|
| | | C1 | C2 | C3 | C4 | C5 | Total |
| Rooms Allotted | A | 42 | 30 | 42 | 40 | 45 | 199 |
| Room Sold | S | 5 | 20 | 4 | 4 | 2 | 35 |
| Rooms Not Sold(that cannot be redistributed) | NS_CNR | 37 | 10 | 0 | 0 | 0 | 47 |
| Rooms Not Sold(that can be redistributed) | NS_CR | 0 | 0 | 38 | 36 | 43 | 117 |
| Total Rooms Not Sold | TNS | 37 | 10 | 38 | 36 | 43 | 164 |
| Rooms Sold per Channel/Total Rooms Sold (P)** | P | 0.1429 | 0.5714 | 0.1143 | 0.1143 | 0.0571 | 1 | 0.2 |
| Percentage Difference in (P) (relative to average) | % C | −28.55 | 185.7 | −42.85 | −42.85 | −71.45 | | −5.7E−15 | 104.972544 |
| Scaled Value | Z | −1.13 | 7.35 | −1.70 | −1.70 | −2.83 | | |
| New Allocation Amount | NAA | 0 | 0 | 0 | 0 | 0 | 0 |
| New Allocation Adjustment | Aadj | 0 | 0 | 0 | 0 | 0 | 0 |
| Final Allocation Amount | FAA | 0 | 0 | 0 | 0 | 0 | 0 |

TABLE 7

INVENTORY DEPLETED BEFORE UNBLOCK
Day 3

| | | Channel | | | | | |
|---|---|---|---|---|---|---|---|
| | | C1 | C2 | C3 | C4 | C5 | Total |
| Rooms Allotted | A | 37 | 10 | 38 | 36 | 43 | 164 |
| Room Sold | S | 10 | 4 | 2 | 2 | 2 | 20 |
| Rooms Not Sold (that cannot be redistributed) | NS_CNR | 27 | 6 | 0 | 0 | 0 | 33 |
| Indicator Variable for a negative number of rooms | | 27 | 6 | 0 | 0 | 0 | 33 |
| Rooms Not Sold (that can be redistributed) | NS_CR | 0 | 0 | 36 | 34 | 41 | 111 |
| Total Rooms Not Sold | TNS | 27 | 6 | 36 | 34 | 41 | 144 |

TABLE 7-continued

INVENTORY DEPLETED BEFORE UNBLOCK
Day 3

| | | Channel | | | | | Total | |
| --- | --- | --- | --- | --- | --- | --- | --- | --- |
| | | C1 | C2 | C3 | C4 | C5 | | |
| Rooms Sold per Channel/Total Rooms Sold (P)** | P | 0.5 | 0.2 | 0.1 | 0.1 | 0.1 | 1 | 0.2 |
| Percentage Difference in (P) (relative to average) | | 150 | 1.388E−14 | −50 | −50 | −50 | | 1.42E−14 | 86.6025404 |
| Scaled Value | Z | 5.94 | 0.00 | −1.98 | −1.98 | −1.98 | | |
| New Allocation Amount | NAA | 0 | 0 | 0 | 0 | 0 | 0 | |
| New Allocation Adjustment | Aadj | 0 | 0 | 0 | 0 | 0 | 0 | |
| Final Allocation Amount | FAA | 0 | 0 | 0 | 0 | 0 | 0 | |
| In this worked example, after this time point, blocked rooms have been redistributed | | | | | | | | |
| Redistribution adjustment from unblocked rooms | RA | 17 | 7 | 3 | 3 | 3 | 33 | |
| Final Allocation Amount After Unblocking | FAA_UB | 17 | 7 | 39 | 37 | 44 | 144 | |

TABLE 8

INVENTORY DEPLETED BEFORE UNBLOCK

| | | Channel | | | | | Total | |
| --- | --- | --- | --- | --- | --- | --- | --- | --- |
| | | C1 | C2 | C3 | C4 | C5 | | |
| Day 4 | | | | | | | | |
| Rooms Allotted | A | 17 | 7 | 39 | 37 | 44 | 144 | |
| Room Sold | S | 17 | 6 | 3 | 2 | 1 | 29 | |
| Total Rooms NotSold | TNS | 0 | 1 | 36 | 35 | 43 | 115 | |
| Rooms Sold per Channel/Total Rooms Sold (P)** | P | 0.5862 | 0.2069 | 0.1034 | 0.069 | 0.0345 | 1 | 0.2 |
| Percentage Difference in (P) (relative to average) | | 193.1 | 3.45 | −48.3 | −65.5 | −82.75 | | 0 | 112.661234 |
| Scaled Value | Z | 7.64 | 0.14 | −1.91 | −2.59 | −3.28 | | |
| New Allocation Amount | NAA | 67 | 0 | 0 | 0 | 0 | 67 | |
| Final Allocation Amount | FAA | 67 | 24 | 12 | 8 | 4 | 115 | |
| Day 5 | | | | | | | | |
| Rooms Allotted | A | 67 | 24 | 12 | 8 | 4 | 115 | |
| Room Sold | S | 10 | 18 | 2 | 2 | 1 | 33 | |
| Total Rooms Not Sold | TNS | 57 | 6 | 10 | 6 | 3 | 82 | |
| Rooms Sold per Channel/Total Rooms Sold (P)** | P | 0.303 | 0.5455 | 0.0606 | 0.0606 | 0.0303 | 1 | 0.2 |
| Percentage Difference in (P) (relative to average) | | 51.5 | 172.75 | −69.7 | −69.7 | −84.85 | | −1.1E−14 | 111.142381 |
| Scaled Value | Z | 2.04 | 6.84 | −2.76 | −2.76 | −3.36 | | |
| New Allocation Amount | NAA | 0 | 0 | 0 | 0 | 0 | 0 | |
| New Allocation Adjustment | Aadj | 0 | 0 | 0 | 0 | 0 | 0 | |

TABLE 9

INVENTORY DEPLETED AFTER UNBLOCK
Day 1

| | | Channel | | | | | | | |
|---|---|---|---|---|---|---|---|---|---|
| | Notation | C1 | C2 | C3 | C4 | C5 | Total | Av. | Dev |
| Blocked Allocation | I | 1 | 1 | 0 | 0 | 0 | | | |
| Rooms Allotted | A | 50 | 50 | 50 | 50 | 50 | 250 | | |
| Room Sold | S | 8 | 20 | 8 | 10 | 5 | 51 | | |
| Rooms Not Sold(that cannot be redistributed) | NS_CNR | 42 | 30 | 0 | 0 | 0 | 72 | | |
| Rooms Not Sold (that can be redistributed) | NS_CR | 0 | 0 | 42 | 40 | 45 | 127 | | |
| Total Rooms Not Sold | TNS | 42 | 30 | 42 | 40 | 45 | 199 | | |
| Rooms Sold per Channel/Total Rooms Sold (P)** | P | 0.1569 | 0.3922 | 0.1569 | 0.1961 | 0.098 | 1.0001 | 0.20002 | |
| Percentage Difference in (P) (relative to average) | | −21.557844 | 96.080392 | −21.557844 | −1.959804 | −51.0049 | | −1.3E−14 | 56.4939457 |
| Scaled Value | Z | −0.85 | 3.80 | −0.85 | −0.08 | −2.02 | | | |
| New Allocation Amount | NAA | 0 | 0 | 0 | 0 | 0 | 0 | | |
| New Allocation Adjustment | Aadj | 0 | 0 | 0 | 0 | 0 | 0 | | |
| Final Allocation Amount | FAA | 0 | 0 | 0 | 0 | 0 | 0 | | |

TABLE 10

INVENTORY DEPLETED AFTER UNBLOCK
Day 2

| | | Channel | | | | | |
|---|---|---|---|---|---|---|---|
| | | C1 | C2 | C3 | C4 | C5 | Total |
| Rooms Allotted | A | 42 | 30 | 42 | 40 | 45 | 199 |
| Room Sold | S | 5 | 20 | 4 | 4 | 2 | 35 |
| Rooms Not Sold(that cannot be redistributed) | NS_CNR | 37 | 10 | 0 | 0 | 0 | 47 |
| Rooms Not Sold(that can be redistributed) | NS_CR | 0 | 0 | 38 | 36 | 43 | 117 |
| Total Rooms NotSold | TNS | 37 | 10 | 38 | 36 | 43 | 164 |
| Rooms Sold per Channel/Total Rooms Sold (P)** | P | 0.1429 | 0.5714 | 0.1143 | 0.1143 | 0.0571 | 1 | 0.2 |
| Percentage Difference in (P)(relative to average) | % C | −28.55 | 185.7 | −42.85 | −42.85 | −71.45 | | −5.7E−15 | 104.972544 |
| Scaled Value | Z | −1.13 | 7.35 | −1.70 | −1.70 | −2.83 | | |
| New Allocation Amount | NAA | 0 | 0 | 0 | 0 | 0 | 0 |
| New Allocation Adjustment | Aadj | 0 | 0 | 0 | 0 | 0 | 0 |
| Final Allocation Amount | FAA | 0 | 0 | 0 | 0 | 0 | 0 |

TABLE 11

INVENTORY DEPLETED AFTER UNBLOCK
Day 3

|  |  | Channel | | | | | Total | |
|---|---|---|---|---|---|---|---|---|
|  |  | C1 | C2 | C3 | C4 | C5 | | |
| Rooms Allotted | A | 37 | 10 | 38 | 36 | 43 | 164 | |
| Room Sold | S | 10 | 4 | 2 | 2 | 2 | 20 | |
| Rooms Not Sold (that cannot be redistributed) | NS_CNR | 27 | 6 | 0 | 0 | 0 | 33 | |
| Indicator Variable for a negative number of rooms | | 27 | 6 | 0 | 0 | 0 | 33 | |
| Rooms Not Sold (that can be redistributed) | NS_CR | 0 | 0 | 36 | 34 | 41 | 111 | |
| Total Rooms Not Sold | TNS | 27 | 6 | 36 | 34 | 41 | 144 | |
| Rooms Sold per Channel/Total Rooms Sold (P)** | P | 0.5 | 0.2 | 0.1 | 0.1 | 0.1 | 1 | 0.2 |
| Percentage Difference in (P) (relative to average) | | 150 | 1.388E−14 | −50 | −50 | −50 | 1.42E−14 | 86.6025404 |
| Scaled Value | Z | 5.94 | 0.00 | −1.98 | −1.98 | −1.98 | | |
| New Allocation Amount | NAA | 0 | 0 | 0 | 0 | 0 | 0 | |
| New Allocation Adjustment | Aadj | 0 | 0 | 0 | 0 | 0 | 0 | |
| Final Allocation Amount | FAA | 0 | 0 | 0 | 0 | 0 | 0 | |
| In this worked example, after this time point, blocked rooms have been redistributed | | | | | | | | |
| Redistribution adjustment from unblocked rooms | RA | 17 | 7 | 3 | 3 | 3 | 33 | |
| Final Allocation Amount_After Unblocking | FAA_UB | 17 | 7 | 39 | 37 | 44 | 144 | |

TABLE 12

INVENTORY DEPLETED AFTER UNBLOCK

|  |  | Channel | | | | | Total | |
|---|---|---|---|---|---|---|---|---|
|  |  | C1 | C2 | C3 | C4 | C5 | | |
| Day 4 | | | | | | | | |
| Rooms Allotted | A | 17 | 7 | 39 | 37 | 44 | 144 | |
| Room Sold | S | 17 | 6 | 3 | 2 | 1 | 29 | |
| Total Rooms NotSold | TNS | 0 | 1 | 36 | 35 | 43 | 115 | |
| Rooms Sold per Channel/Total Rooms Sold (P)** | P | 0.5862 | 0.2069 | 0.1034 | 0.069 | 0.0345 | 1 | 0.2 |
| Percentage Difference in (P) (relative to average) | | 193.1 | 3.45 | −48.3 | −65.5 | −82.75 | 0 | 112.661234 |
| Scaled Value | Z | 7.64 | 0.14 | −1.91 | −2.59 | −3.28 | | |
| New Allocation Amount | NAA | 67 | 0 | 0 | 0 | 0 | 67 | |
| Final Allocation Amount | FAA | 67 | 24 | 12 | 8 | 4 | 115 | |
| Day 5 | | | | | | | | |
| Rooms Allotted | A | 67 | 24 | 12 | 8 | 4 | 115 | |
| Room Sold | S | 10 | 18 | 2 | 2 | 1 | 33 | |
| Total Rooms Not Sold | TNS | 57 | 6 | 10 | 6 | 3 | 82 | |
| Rooms Sold per Channel/Total | P | 0.303 | 0.5455 | 0.0606 | 0.0606 | 0.0303 | 1 | 0.2 |

TABLE 12-continued

INVENTORY DEPLETED AFTER UNBLOCK

| | | Channel | | | | | |
|---|---|---|---|---|---|---|---|
| | | C1 | C2 | C3 | C4 | C5 | Total |
| Rooms Sold (P)** Percentage Difference in (P) (relative to average) | | 51.5 | 172.75 | −69.7 | −69.7 | −84.85 | −1.1E-14  111.142381 |
| Scaled Value | Z | 2.04 | 6.84 | −2.76 | −2.76 | −3.36 | |
| New Allocation Amount | NAA | 0 | 0 | 0 | 0 | 0 | 0 |
| New Allocation Adjustment | Aadj | 0 | 0 | 0 | 0 | 0 | 0 |

Embodiment for Application without a Predetermined Period

Figure 5:
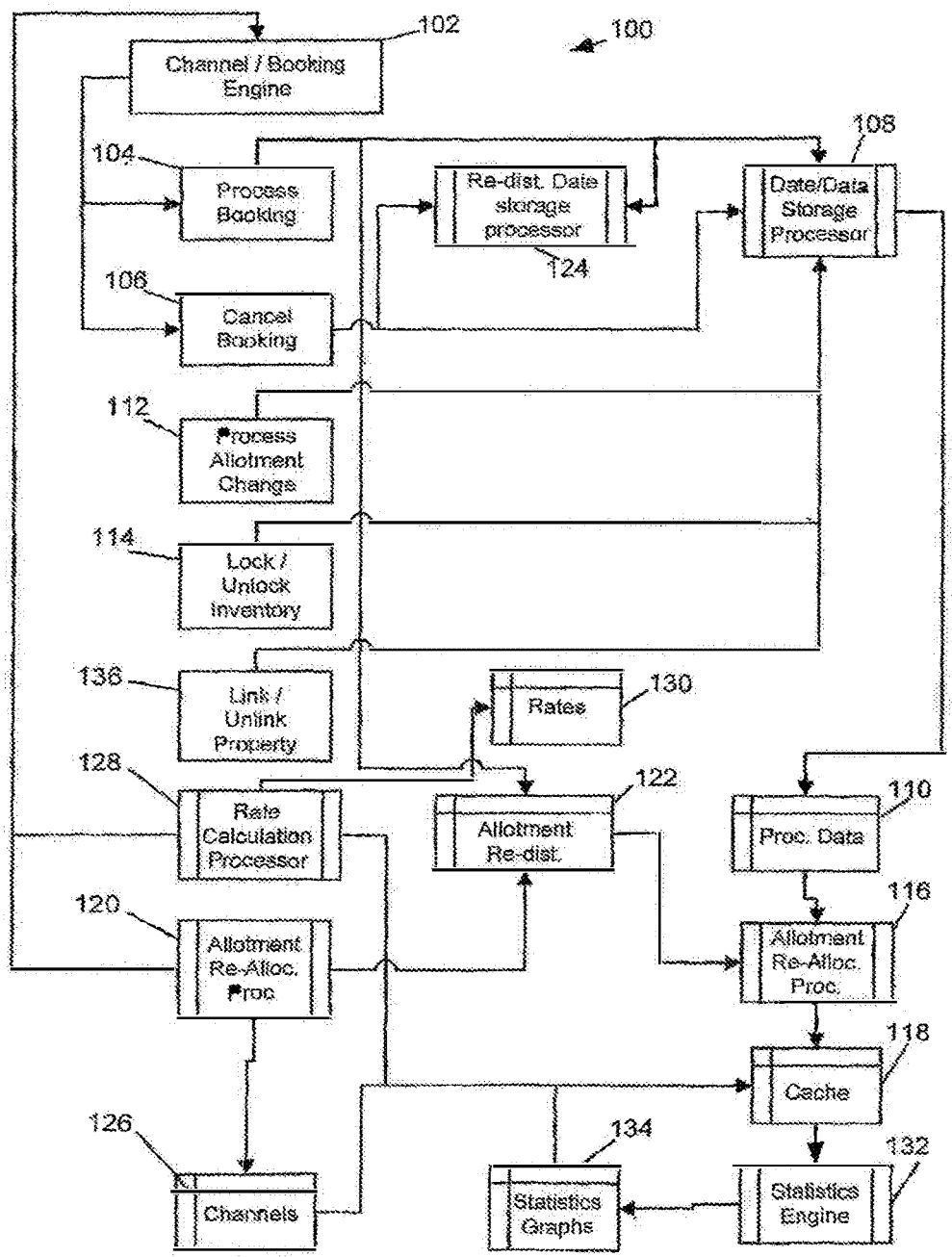
FIG. 5 shows a schematic flowchart of an exemplary embodiment of a method for managing inventory allocations.

The following paragraphs relate to the schematic flowchart set out in FIG. 5 and referred to generally with reference numeral 100. The schematic flowchart 100 represents an embodiment of a software product in the form of instructions stored on a non-transitory computer-readable medium executable by a computer and a method for managing inventory allocated to respective re-sellers. In particular, the product provides flexibility in the application of the generated performance indicator referred to with the variable Z in the previous embodiment to current and future "Yield Management" techniques (i.e. techniques relating to maximizing the financial yield from inventory allocations). It is to be appreciated that the performance indicator can also be referred to as a control indicator, since it is used to control non-contingent values. These can include values of "price" referred to above.

In the following description, the variable symbols used correspond with those defined in the description of the previous embodiments, unless otherwise indicated.

The software product 100, comprising computer-readable instructions, is also configured to separate various processes and calculations into stages to limit the amount of processing needed when applying the indicator (Z) to "Yield Management" techniques and to cache the data for appropriate re-use (e.g. statistical analysis). This allows operations to be performed on the indicator without the need to calculate it every time. A person of ordinary skill in the field would appreciate that such a product, when executed, can reduce data processing load on the computer 12, when compared with load that would result in calculations having to be carried out across all databases for each operation.

For convenience, the allocation of inventory will be referred to as a Room, with the understanding that this embodiment can be applied to any allocation of inventory. Furthermore, the Rooms can be associated with a particular Property to envisage the situation of, for example, a resort attempting to obtain the best yield from the Rooms it has available. "Property" could also be understood to be more than particular geographical location. For example, it could be a certain category of properties, or a chain of resorts. In other words, the Rooms are grouped into Properties to provide a meaningful comparison between performances achieved by different Channels. In addition, the embodiment can be applied to relational databases that could carry any form of data, not necessarily relation to sale of inventory.

Each logical progression is numbered and explained below and refers to the program flow depicted by FIG. 5.

Processes Initiated by a Channel/Booking Engine

The software product 100 defines a remote booking engine 102 that uses a suitable communications protocol to receive booking data at 104 for a property and room type when made via a channel.

Processes that Feed Data into a Data Storage Function

When a booking is processed and the booking data is entered into the system, the software product 100 calls a data storage function 108 for storing the booking data in a Data Processing Table 110. The function 108 writes an appropriate date range (arrival date and departure date less one day) and associated room identification data (Room ID) to the table 110.

When a cancellation is processed at 106, the software product 100 calls the function 108 for storing a record in the table 110. The function 108 stores the date and Room ID in the table 110.

Allocation allotment changes are processed at 112 in a suitable allotment interface. The function 108 is called and the appropriate date range (Date Range) and associated Room ID is passed to the function 108 which stores the Date Range and Room ID in the table 110. If more than one Room is chosen for allocation changes then more than one record of the change is created in the table 110.

It will be understood that certain Rooms in a particular property could be locked or unlocked from processing by the software product 100 due to a previous negotiation with a specific channel, as envisaged in the previous embodiment. When Rooms for a channel are locked or unlocked at 114 via an interface referred to as a Channel Connection Interface, a section of the Rooms available on a given date for the associated channel is removed from or added to a re-distribution pool of Rooms by the function 108. When this occurs, all cached records for Rooms from an associated property are re-calculated based on a resultant re-distributable pool. The appropriate date ranges (from a day the Rooms are locked until a last allotment date for that Property), as well as all the Room I D's for that Property, are passed to the function 108 which stores the records in the table 110.

Calculating a Performance Indicator from the Data Processing Table

This is a process that runs constantly. Steps 1 and 2 below are repeated as long as there is data to select from the table 110.

1. The records are selected by a function 116 consecutively from the table 110 in the order of entry.

2. An algorithm defined by the function 116 is then processed for each day and associated Room ID in the date range stored in the table 110.

A difference between this embodiment and the previous embodiment for a predetermined timeline is that a concept of a "re-distribution timeline" (the five days in the Tables) is not introduced at this stage. This means that a value of "Sum_A" only includes the allotments from channels participating in the re-distribution process for a Room Type (i.e. a Room in a particular Property) and date of a particular record.

In order to participate in this embodiment, a channel must not be holding blocked inventory. Also, the channel must at least have an "allotment value" for the Room via the channel on the given date in the record. An "allotment value" is an entry in a database table used by the product 100 to associate channels with Rooms, Room types, available dates and other characteristics usually associated with a booking. "Sum_NSR" therefore only includes rooms that are sold from a re-distributable pool. Per channel, the function 116 computes the following:

1. Record Rooms Allotted (A) and Rooms Sold (S);
2. NS_R=A-S (The C is dropped since C & CN are indicators of whether or not a particular Room can be sold and as that differentiator is not applicable in this embodiment);
3. T=A-S;

Next,
4. Calculate Sum_S and Sum_NSR using the values from the previous 3 steps;

Per Channel,
5. Calculate P as S/Sum_S. Now, the function 116 compares each of the amounts obtained at step 5 to the average proportion sold per channel;
6. Compute the average of the P's;

Again, per channel,
7. Compute a percentage change (% C) of each P relative to the average P;
8. Compute the average percentage change and the standard deviation of this percentage change;

Using these values, per channel,
9. Subtract the mean Percentage Change from each % C; and
10. Divide the result returned by the previous step through by (Standard Deviation of the Percentage Change)(Square Root (Number of Channels)).

The results of these calculations are then recorded or updated for each date processed and for each Channel that has a Room allocated on the respective date, for the Room Type being processed, into a cache table 118.

Re-Distributing Rooms Triggered by Booking and Cancellation Processes

When the booking processing is complete and it has been calculated that a Channel has run out of Rooms for a Room Type then an Allotment Re-Distribution Date Storage function 120 is called to store the Room ID and date where re-allocation is required into an Allotment Re-Distribution Table 122 that carries or stores distribution values.

If it is determined that there are no more Rooms to re-distribute for a particular Room ID and date then the data is not entered into the table 122 as no re-distribution is required.

When the cancellation processing is complete and a new Room exists for the Room Type then an Allotment Re-Distribution Date Storage function 124 is called to store the Room ID and date where re-allocation is required in the table 122.

Each record is selected from the table 122 and processed by the function 122 one by one in order of entry into the table 122.

The channels that participate in a re-distribution process described above for a particular Room Type and date are selected from a channels table 126. To satisfy "participation" criteria they must not be holding inventory that is "locked" in the channel. They must also at least have an allotment value, as described above for the Room via the channel on the given date. In other words there must be an entry in the table 126 that associates the channel and the Room.

They must also be currently linked to the Property via an active ClientChannels table record. An active ClientChannels table record is a record in a ClientChannels table that links to an interface used by a vendor to select a particular Channel. Thus, the table record contains a list of channels available for selection by the vendor. In order for the particular record to be active, that channel should have been selected by a vendor to participate in the reselling of the vendor's inventory (Rooms for this particular example). It will be appreciated that "vendor" is used broadly and can be interchanged with "Property" as that word has been defined earlier.

Once the participant channels have been determined, the function 120 uses the performance indicator (Z) for the channel to order a list in the channels table 126 from highest performing Channel first to lowest performing channel last. If there are channels in the list that have the same performance rating then the function 120 uses a randomizing algorithm to order those channels.

After the order has been determined, the function 120 counts the number of Rooms in the re-distributable pool for the day in question and loops through the list of channels assigning one Room to each channel in the list in turn until the number of re-distributable Rooms is exhausted. If the list of channels is exhausted and there are still Rooms to be distributed, the looping process is repeated until there are no more Rooms to distribute.

Once a count of Rooms to be allotted has been determined, the function 120 generates the necessary script to facilitate allotment with OTA XML and communicates it to the channels via the protocol used by OTA. OTA stands for the Open Travel Alliance. That organization has developed an XML standard (OTA XML) that facilitates online bookings and allocations.

Price Modification

A price or rate calculation function 128 is called and executed every 24 hours by a time-based scheduling device or cron. The function 128 adjusts non-contingent values in the form of prices for 30 days into the future from the date on which it is executed for all channels that have rooms with allotments on the days in question.

The function 128 initiates by uploading a list of the dates to process. Next it selects all the Room and channel combinations from the table 122 that actually have an allotment value for the respective dates. The allotment value must be greater than 0 as there is no reason to increase the price of a room if there is nothing to sell.

Then it selects a performance or control indicator Z for a Room and channel combination from the cache 118.

The function 128 then selects a current price for the room via that channel on the date it is executed as well as a minimum rate (the rate it cannot go below) for that date/Room I Channel combination.

It then carries out an adjustment on the rate according to Z and the corresponding adjustment value from an adjustment table referred to in the previous embodiment making sure it does not drop below the minimum rate.

A Rates table 130 is then adjusted accordingly and the OTA XML created for transfer of the respective rate to the Channel.

Linking and Unlinking Rooms

At 136, the software product 100 provides an interface to permit the Property to lock inventory (Rooms) out of the algorithms of the software product in the event that a Property has negotiated a block of the Rooms with a particular vendor. In the event that Rooms are to be released back for participation in the software product 100, the interface 100 allows the Rooms to be "unlocked".

Statistical Analysis

A particular advantage of exemplary embodiments is that they provide the cache 118 that is accessible with a statistical analysis engine 132. The engine 132 is configured to perform statistical analyses on the data collected in the cache 118 to assess the performance of the algorithms used by the software product of the invention.

The statistical assessment can be carried out manually. However, it is preferable that the assessment be carried out with a suitable application such as that known as a genetic or self-learning algorithm.

In order to achieve that, a statistics table 134 is provided to receive data from the statistical analysis engine 132.

Database Management

As envisaged in paragraphs [0074], [0079], [0170], [0181], [0228] and elsewhere in the published parent application of U.S. patent application Ser. No. 16/924,395, the embodiments described above lead to increased efficiencies in the operation of the data processing apparatus. The following description is intended further to clarify the manner in which the increased efficiencies are achieved without the addition of new material to the description as set out in the Parent Application. As set out in paragraph [0080] two methods in which data can be received from respective Channels have been conceived. These are "real time" and "request-based" (also known as polling) methods. Use is made of the word "temporal" in the following description to characterize the time-based nature of operation of the computer 12. Furthermore, the "real-time" and "request-based" data are described as being received at "receiving times" for convenience.

At an independent time, for example as described in paragraph [0115] of the Parent Application, the subroutine 24 is executed to readjust distribution values (number of rooms) at "refreshing times".

Reference is made to "relational database fields". These are previously described and shown as entries or records in spreadsheets, for example, Excel spreadsheets. It is to be appreciated that such spreadsheets are effectively relational databases with a collection of database fields that are capable of being updated by the computer 12 when executing the computer readable instructions of the software product. As described above, execution of the software product allows the computer 12 to make efficient use of a processor when handling the databases.

For the purposes of this description, FIGS. 6 to 12 have been added further to clarify the steps described above that lead to efficient collection of data. Furthermore, the following description makes use of the word "values" to describe, generically, the parameters set out in the above tables. This is for clarity in describing the method of using the computer 12 to manage or control a distributed database.

Reference is also made to a "relational database". As is commonly known in the art, a relational database is a collection of data items organized as a set of formally-described tables in which data is structured to recognize relations between stored data entries and that can be accessed or reassembled in many different ways without having to reorganize the database tables. In the above embodiments, and as set out above, it can be said that the tables are relational databases. Furthermore, throughout the above description, reference is made to tables with changing cell values. It follows that the use of the term "relational database" is for convenience and for a proper understanding of the role of the various components shown in FIG. 1, for example.

As set out above, the tables are updated if and when certain conditions apply. See, for example, the description of the manner in which the tables are established. It follows that values in the tables are contingent upon certain conditions. These are referred to as contingent values. These conditions arise out of sporadic interactions between the subscribers 20, clearly making use of terminal computer systems indicated in FIG. 1 and the servers 18, which are distributed computer systems. The term "sporadic" has been introduced to reflect, in the examples provided above, the necessarily sporadic nature of bookings or consumption by the public. The values can therefore also include non-contingent values, such as the price of an allotment or allocation, which are related to the contingent values.

In the above description, reference is made to various ratings and indices to reflect the performance of Channels. See, for example, paragraph [0067] of the published parent application of U.S. patent application Ser. No. 16/924,395. Those are referred to as control indicators in the following description since they can be used to control the manner in which fresh initial values are determined for sending to the contingent and non-contingent distributed database fields. Those control indicators are also used, in some instances, to control priorities for refreshing of distributed databases field.

Figure 6:
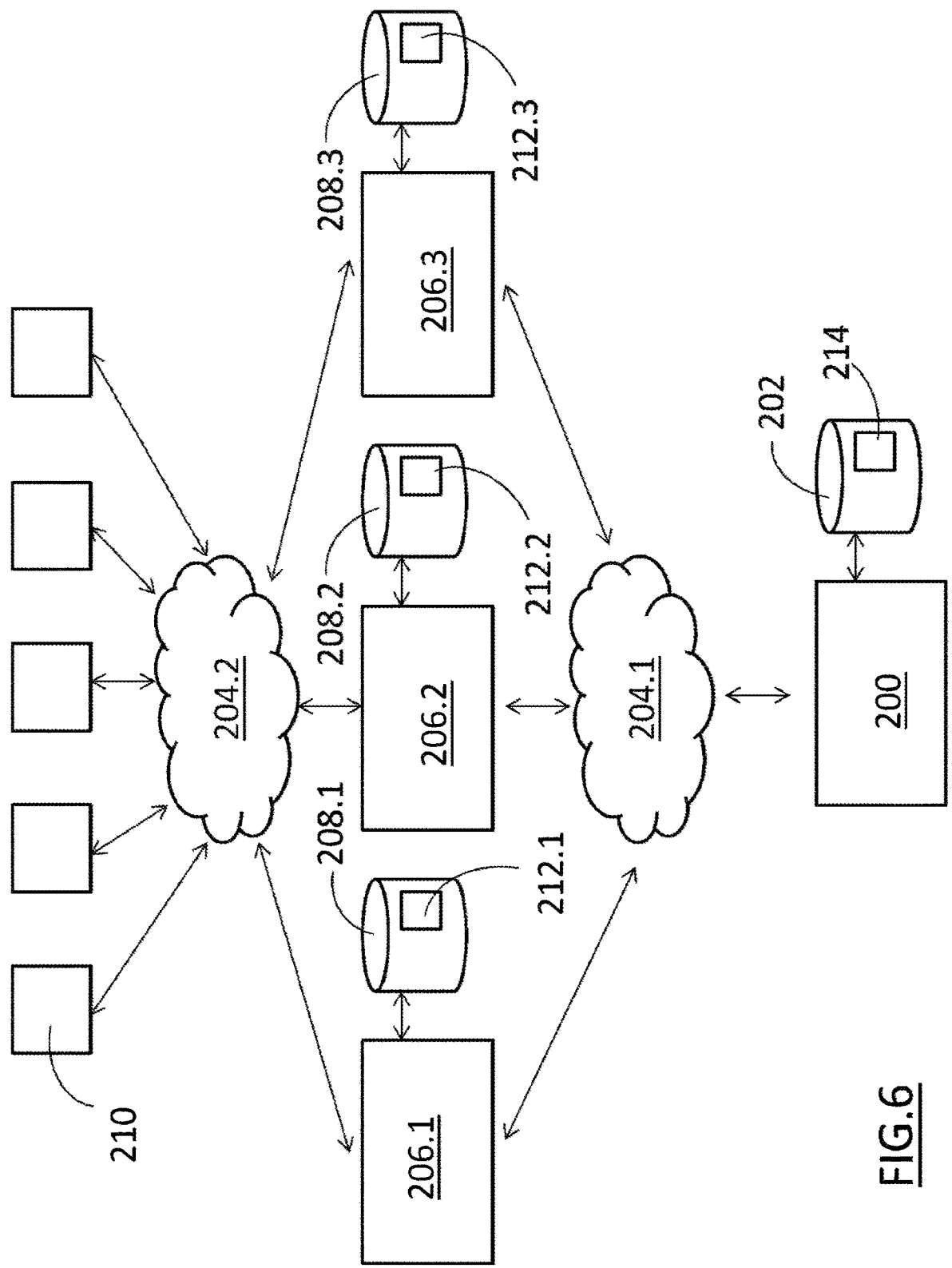
FIG. 6 shows a schematic drawing of a central server and a central database that are in communication with an affiliated distributed database that is distributed over a plurality of distributed servers.

The computer 12 can be considered to be a central computer system in the form of a server 200 (shown in FIG. 6 as a further example). The server 200 has a central relational database 202. The server 200 is in data communion with a data communication network 204, such as the Internet. A plurality of distributed computer systems (servers) 206.1 to 206.3 (also represented as the channels 18 in FIG. 1) are connected to the network 204 and include a distributed database 208 that has database fields 212.1 to 212.3. In the above example, these would be necessary for receiving and sending information such as the sale price, rate of commission, and number of items sold, as described in paragraph [0057] of the Parent Application.

Terminal computer systems, such as PCs, tablets, phones, and the like (also represented as members or subscribers 20 in FIG. 1) interact with the distributed servers 208 sporadically in ways that alter some of the values of the database fields 212 in the distributed database 208. It is envisaged that the terminal computer systems can incorporate, wholly or in part, the distributed servers. In the drawings, the distributed servers are shown separately for clarity only. In other embodiments, the distributed servers can be cloud-based so as not necessarily to be represented by separate physical servers. For example, the servers can be virtual servers distributed across networks.

Each distributed database 208 is affiliated with the central relational database 202 in the sense that the central sever 200 and central relational database 202 determine values for the distributed database fields 212 according to predefined relationships or conditions that have to be met. Those values are then used to populate the associated distributed database fields 212 of the distributed database 208. A difficulty occurs when the values of the distributed database fields 212 are contingent on sporadic interaction between terminal computer systems and the distributed servers 210, which varies the values of the database fields 212 sporadically and unpredictably out of their relationship. This would clearly be the case where the values depended on, for example, booking rates, as envisaged above.

Consequently, the central server 200 and central database 202, from time-to-time, have to update or refresh the values in the distributed database fields 212 to restore their appropriate relationships as per the allowable relationships or conditions reflected in the central database 202. Some of these allowable relationships or conditions are reflected in the above description with reference to various types of tables.

Monitoring those sporadic changes and refreshing the values accordingly in the distributed database with the central server and database, poses practical difficulties to ensure a sufficient degree of the reliability of the data which, in turn, requires efficient updates, redundancy, and the like.

In accordance with an embodiment, as further described below, various techniques are provided for refreshing the distributed database 208 as required by the central server 200 and central database 202 to maintain a sufficient degree of data reliability over and above the unpredictable interactions of the terminal computer systems 210 with the distribution servers 206, so as still to enable many useful applications.

Figure 7:
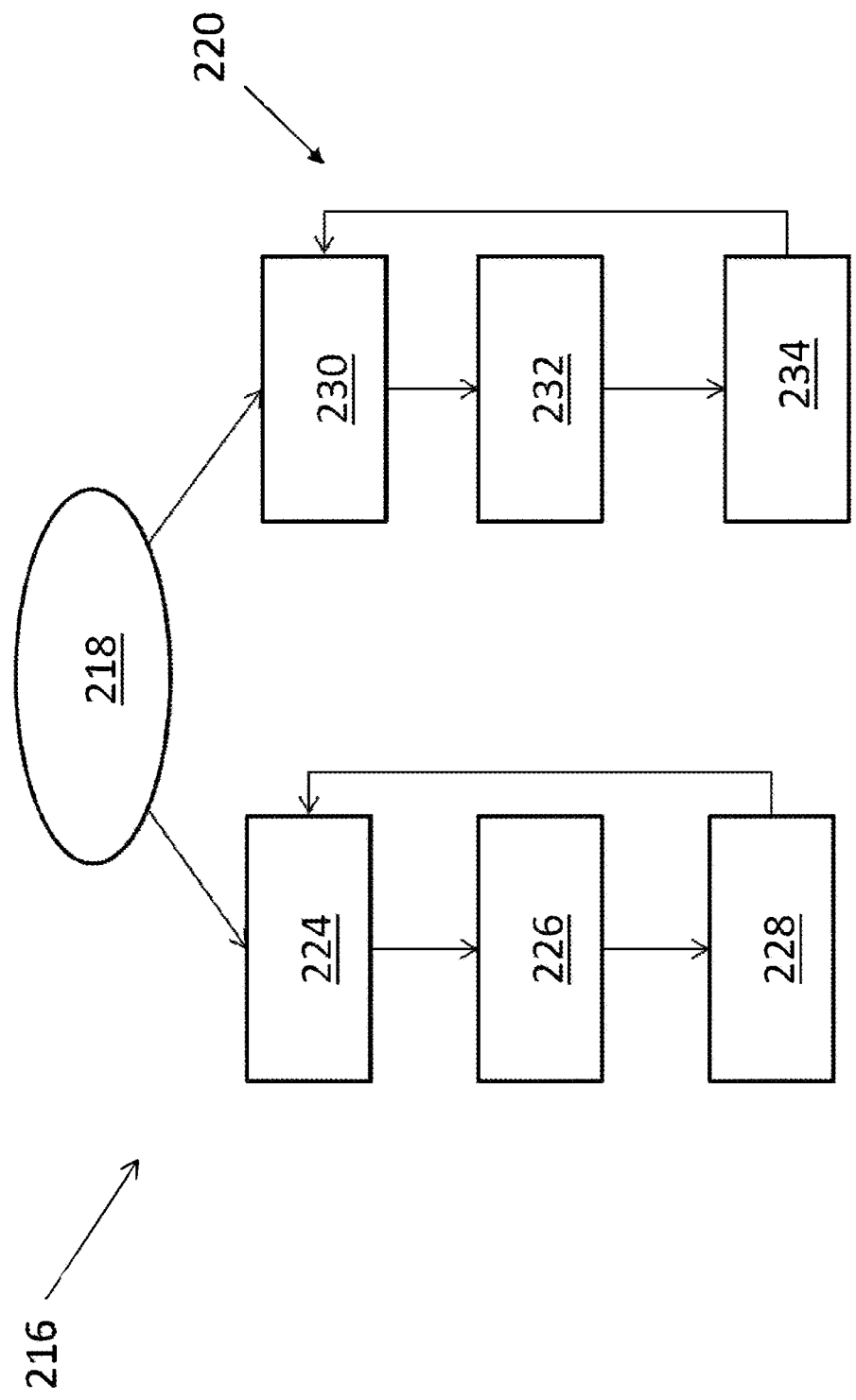
FIG. 7 shows a functional flow diagram of a method in accordance with an embodiment.

In FIG. 7, reference numeral 216 indicates generally a method of using a central server 200 having the central database 202 systematically to refresh the distributed database 208 that is distributed over the plurality of distributed servers 206. The distributed database 208 includes a least some database fields 212.1A to 212.3A that store contingent values. In other words, they store values that vary subject to sporadic interactions between the terminal computer systems 110 and the distributed servers 208.

Broadly, the method 216 includes executing computer instructions, at 218, which cause two separate parallel processes, 220, 222, to execute on the central server.

One process, a receiving process 216, broadly includes recurrently, at receiving times, noting, at 224, the receiving time for receiving contingent values of the distributed database fields 212.1A to C from the distributed servers 208, and storing, at 226, the received values in the central relational database 202 in succession with previously received and stored contingent values of the distributed database fields, so as to build, for each distributed server an associated series of successive contingent values 214.1A to C. This process can result in the generation of one or more of the tables described herein.

The other process, a refreshing process 220, broadly includes recurrently, at refreshing times, noting the refreshing time, at 230, determining, at 232, fresh initial distribution values for the distributed database fields based on the successive contingent values 214.1A to C of the distributed servers 206 and based on required initial distribution conditions, and distributing, at 234, the fresh initial distribution values to the distributed database fields of the distributed servers 206.

The two processes can run in parallel and are temporally independent in a way that the receiving process 220 controls receiving of data, say values, from the distributed database 208 in its own time, and the refreshing process 222 controls refreshing of the distributed database 208 in its own time, without the one process interfering with the other process.

An example of this process is shown in FIG. 4, where a real-time and a polled distribution channel are shown operating independently.

Regarding the receiving process 216, in this embodiment, three techniques are provided further to reduce temporal dependency and therefore to increase the applied diversity of the system.

Figure 8:
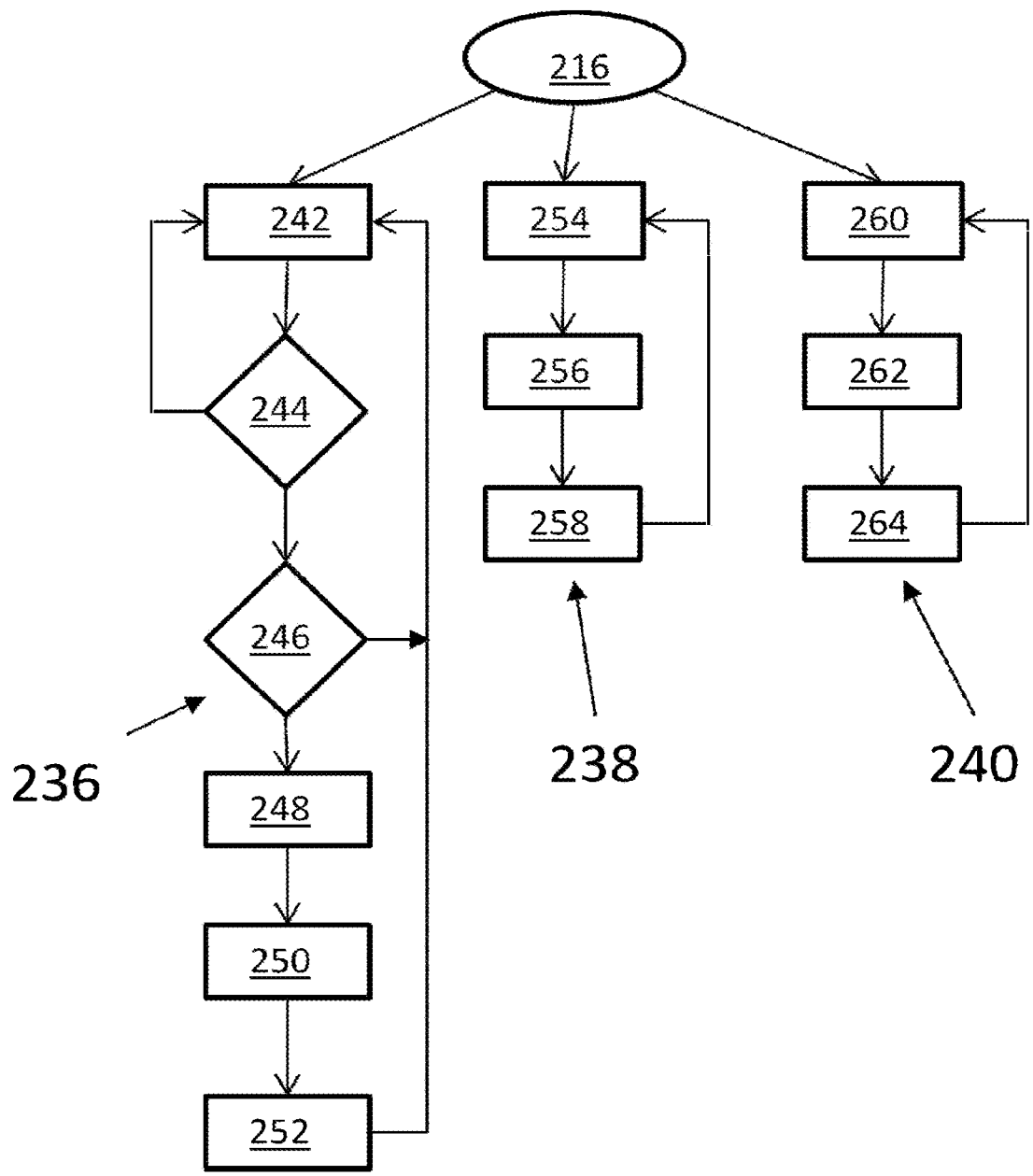
FIG. 8 shows a functional flow diagram of part of the diagram in FIG. 7, in more detail.

Referring to FIG. 8, three processes 236, 238, and 240 are provided, in which, generally, process 236 is used for the case in which a distributed server 206 needs to be prompted (polled) at times, to send the contingent values of its database fields 212 to the central server 200 for storing in the central database 202. Processes 238 and 240 are for cases in which the central server is configured to wait for automatic responses from the distributed servers 206 that send the contingent values at times. The three processes described here are reflected somewhat in FIG. 4, with FIG. 5 providing further clarification.

When process 236 executes, then, at 242, the central server selects a distributed server. At 244, a check is performed to determine if that distributed server 208 needs to be prompted for receiving the contingent values or if the distributed server 208 is configured automatically to send the contingent values to the central server 200. If the distributed server needs to be prompted, then, at 246, the central server determines if it is time (a receiving time) to receive the contingent values from that distributed server, and if it is, then prompt the distributed server 208, at 248. At 250, the contingent values are received from the distributed server 208, and the central database is updated at 252. The process then returns to 242 to select another distributed server and to repeat the process 236. If, at 244, the central server determines that the distributed server need not be prompted, then the process returns to 242 to select another distributed server 208 and to repeat the process 236. The same applies at 246.

Process 238 is for controlling the case when a distributed server is configured to send the contingent values to the central server periodically and automatically. When the process 238 executes, the central server receives, at 254, contingent values from a distributed server. At 256 the central server determines which server sent the contingent values, and, at 258, the central server updates the central database 202.

Process 240 is similar to process 238, except that process 240 is for controlling the case when a distributed server is configured to send the contingent values only once a change in the contingent values occurs. When the process 240 executes, the central server receives, at 260, contingent values from a distributed server. At 262 the central server determines which server sent the contingent values, and, at 264, the central server updates the central database 202.

Figure 9:
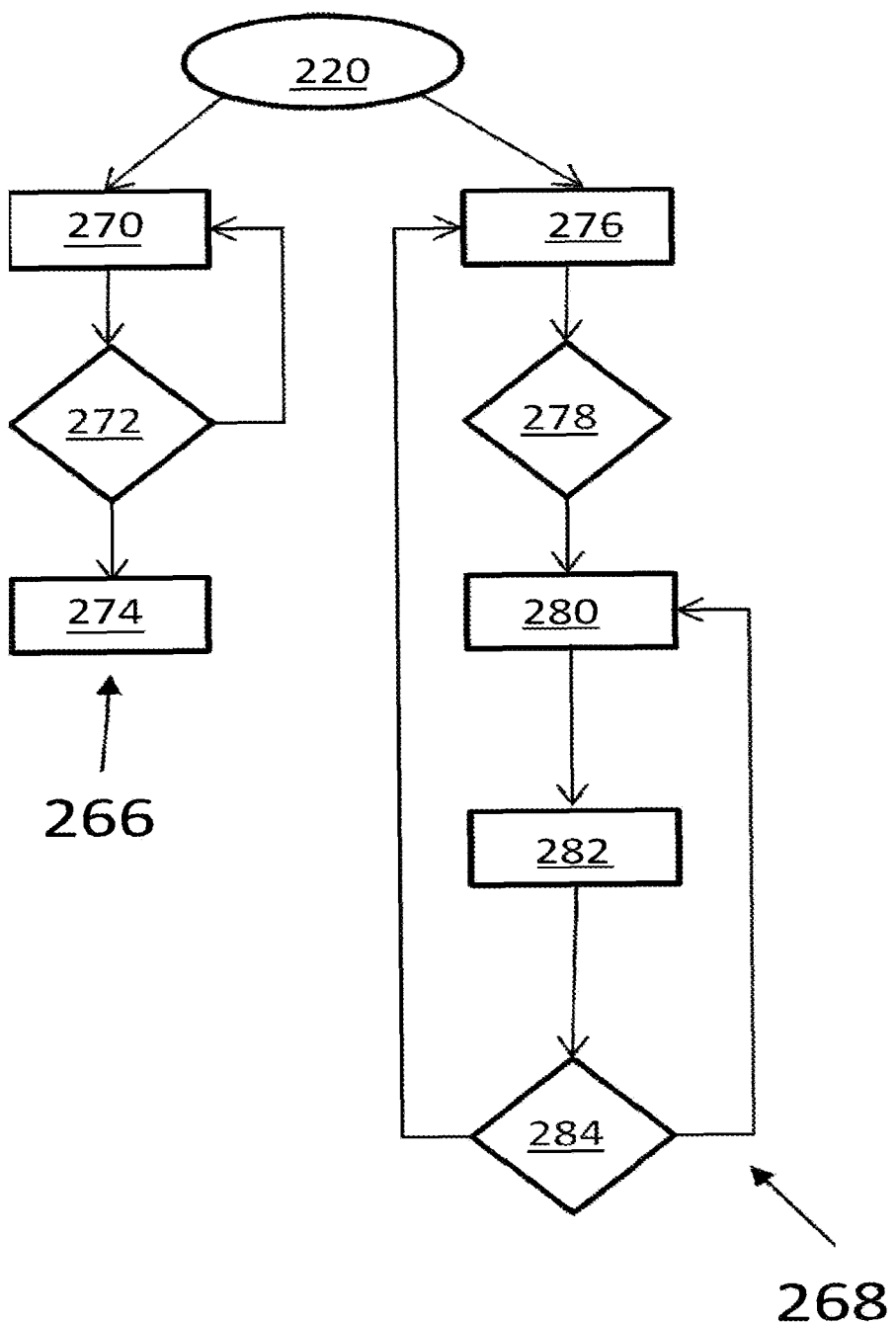
FIG. 9 shows a functional flow diagram of part of the diagram in FIG. 7, in more detail.

In this embodiment, process 220 is also further split into temporally independent processes. Referring to FIG. 9, process 266 is for determining, at refreshing times, fresh initial values for the distributed database, and process 268 is for distributing, at distributing times, those fresh initial values to the distributed database 208.

Broadly, when process 266 is executed, then, at 270, the central server 200 times the refreshing process, and at 272 checks if it is time to determine fresh initial values for the distributed database fields, and if so, then determines, at 274, the fresh initial values for the distributed database based on successive contingent values of the distributed servers and based on required initial conditions and relationships. Otherwise the process returns to 270. At 274, the fresh initial values are stored in the central database 202 ready for distribution to the distributed database 208.

Process 268, when executed, broadly involves timing, at 276, when it is time to distribute the fresh initial values to the distributed servers 206, and to check if it is time, at 278, to refresh or update the distributed database 208. If so, at 280, a relevant distributed server is selected, and the fresh values are sent to the distributed server at 282. At 284, the computer 12 checks if there are other servers that still need updating, and if so, proceeds to 280 to select and update the relevant distributed server. Otherwise, the process proceeds to 276.

Figure 10:
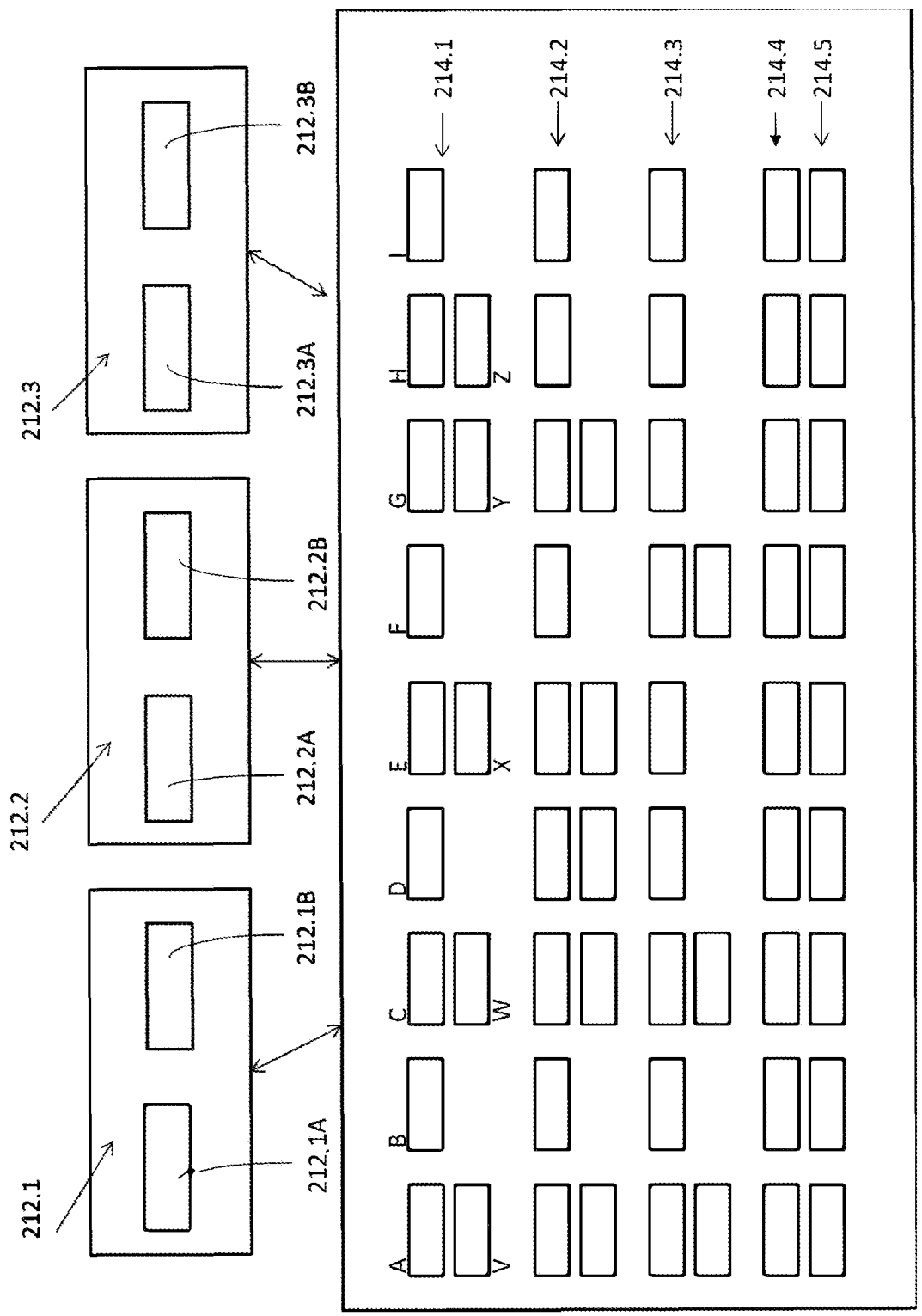
FIG. 10 shows a schematic diagram of a central database and a distributed database of the embodiment shown in FIG. 6.

In order to explain more specifically how the central database is updated at 252, 258, 264, in the above processes, and how the fresh initial values are determined, at 274, for the distributed database, reference is first made to FIG. 10 that shows a simplified version of a central database and an affiliated distributed database to assist with the explanation.

The central database 202 includes a set of database fields 214 that make provision for storing series of values. As can be seen, this can readily be shown in table format and is, effectively, a generic form of either of the tables described above. In particular, the series of central database fields 214.1, 214.2, 214.3 are respectively affiliated with distributed database fields 212.1. 212.2, and 212.3. These include fields 212.1A, 212.2A and 212.3A for storing contingent values and 212.1 B to 212.3B for storing non-contingent values that do not vary directly by interaction of the terminal computer systems with the distributed servers.

When any one of the processes 252, 258, 264, updates the central database, the recently received contingent values are added to their affiliated series of contingent values that represent a history of the database fields. See, for example, successively received contingent values 214.1 B, 214.1 D, 214.1 F, 214.1 H, 214.11, which are affiliated with distributed database field 212.1. Also, when, at times, the fresh initial values are determined and the affiliated distributed database field is successfully updated, then the initial values are also stored within the series of values at their appropriate times. See for example, 214.1 C, 214.1E, 214.1G.

In some cases, at refreshing times, it might be necessary for the central database also to determine fresh values for refreshing the non-contingent database fields at the same time as their related contingent fields are refreshed. For that reason, if a fresh non-contingent value is determined then it is also stored in the database set in relation to its related contingent value. See for example, 214.1V, 214.1W, 214.1X, 214.1Y and 214.1Z that are stored in relation to 214.1 A, 214.1 C, 214.1 E, 214.1 G, 214.1 H.

The central database also includes conditional or relational fields 214.4 that are used, at least in part, to define relationships between the fresh initial values when being determined for the contingent database fields. Similarly, the central database also includes conditional or relational fields 214.5 that are used, at least in part, to determine a non-contingent value in relation to an associated fresh initial value for the contingent database field.

Figure 11:
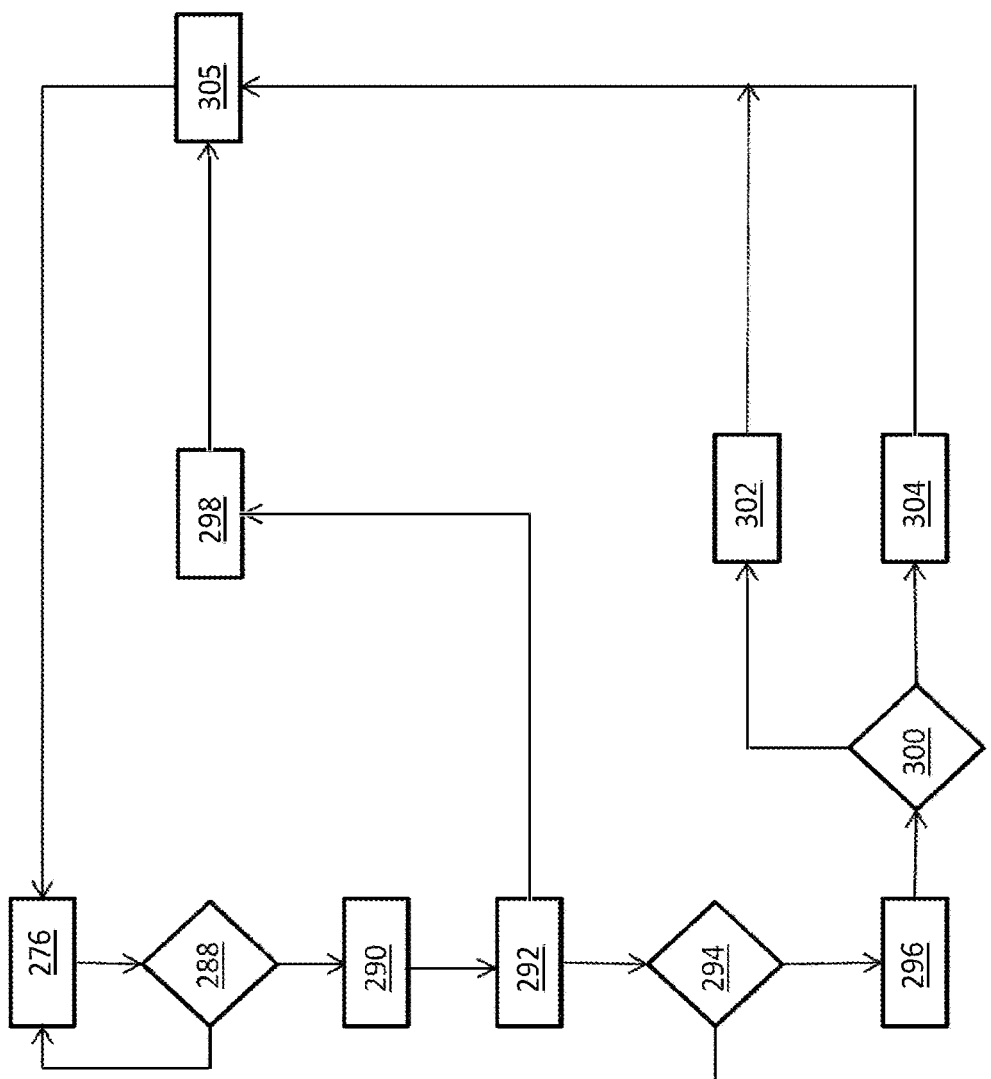
FIG. 11 shows a functional flow diagram of part of the diagram in FIG. 7, in more detail.

Referring to FIG. 11, one embodiment of the process 268 is shown in more detail. Process 268 executes, and monitors, at 276, refreshing times for the initial values of the database fields 212 of the distributed servers 206. These refreshing times can be predefined, or dependent on variables. When it is time, decided at 288, to determine fresh initial values for the distributed database, then, at 290, one of the distributed servers is selected, and an individual control indicator is determined, at 292, for that distributed server based on selected past initial- and contingent values for that distributed server.

At 294, the central server 200 determines a relationship between the individual control indicator and some predefined conditions, and if those conditions are not met then a fresh non-contingent value is determined, at 298. However, if those conditions are met, then a group control indicator is determined, at 296. At 300, the central server 200 determines a relationship between the individual control indicator and some predefined conditions, and if those conditions are not met then a fresh non-contingent value is determined at 302.

Otherwise, if those conditions are met, then fresh initial distributed values are determined, at 304.

At 305, the central database is updated with the fresh initial distributed values, and the distributing process can now update the distributed database in its own time.

Figure 12:
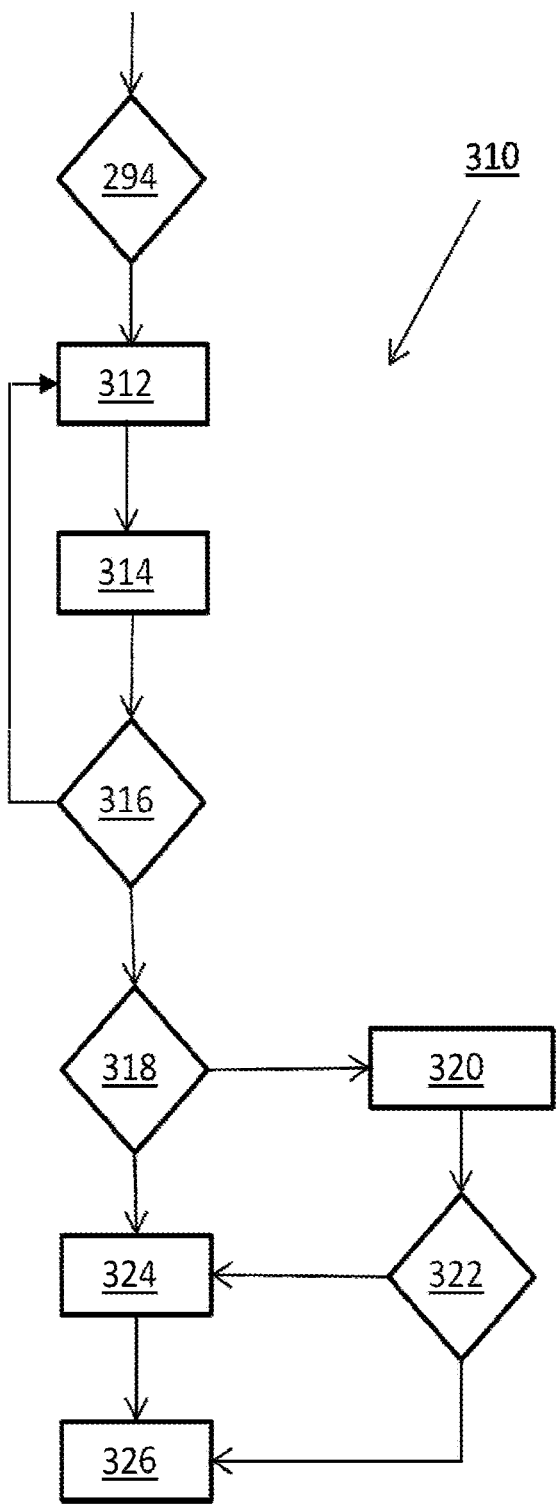
FIG. 12 shows a functional flow diagram of part of the diagram in FIG. 7, in more detail.

Referring to FIG. 12, another process 310 is shown that is used to supplement or expand process 268. In particular, process 310 is used to expand process 268 in the case that it is determined, at 294, by the central server 200 that the relationship between the individual control indicator and predefined conditions, are not met. In that case, at 312, the central server selects a distributed server and determines, at 314, an individual control indicator (and/or) a group control indicator. At 316, a check is performed to determine if there are more servers that need considering and, if so, the process returns to 312 in which the next server is selected, and an individual control indicator and/or a group control indicator is determined also for that server, until an individual control indicator and/or group control indicator is determined for each distributed server.

At 318, the central server determines if a fresh initial value has to be determined for any of the distributed database fields that are for storing contingent values and, if so, then, at 320, fresh initial values are determined as needed for the distributed database.

Thereafter, a further check is performed, at 322, to determine if any one of the fresh initial values meets some predefined conditions, and if so, then the central server 200 proceeds to 324, to determine a fresh non-contingent value that is related to the contingent value, and the central database is updated at 326. Otherwise, at 322, the process proceeds directly to updating the central database.

The fresh initial values for the contingent database fields and the related non-contingent values, once determined and stored in the central database, need to be sent to the distributed database. Regarding updating or refreshing of the distributed database, there are a few techniques that this embodiment provides, that enable updating or refreshing of the distributed database fields at the distributed servers.

In one embodiment, the central server is configured to detect only those fields in the central database within a set of database fields that have been updated with fresh initial values or fresh non-contingent values, and then systematically only to update those fields in the affiliated distributed database field over time as opposed to rolling out entire set of values of the set of database fields.

In another embodiment, or in addition to the above, the central server is configured to make use of the individual, and/or group control indicators to determine priorities for updating the various distributed database fields, and update those distributed database fields with higher priorities first.

In this Specification, the following definitions provided below are applied.

"Inventory" is any item, whether tangible or intangible, that is capable of being transferred or distributed from one party, entity, apparatus, or consumption source to another and in respect of which it may be required to control and monitor quantity, rate of consumption and other parameters. The definition is not limited to items that are sold. For example, it can encompass items or measures of fluid that are fed from one apparatus to another and where is may be desired to monitor, measure or otherwise determine characteristics of the inventory and the manner in which is it transferred, such as a rate of transfer.

"Computer" is any apparatus capable of carrying out data processing functions and includes a computer system, or a collection of one or more apparatus, including mobile apparatus, such as smart phones, tablets and other hand-held devices.

"Allocations" are representations of items of inventory that are allocated to portals, channels, and other distribution agents for allocation or re-allocation to other portals, channels and distribution channels. These are also referred to as "allotments" in this specification.

"Distribution Channels" are portals, outlets, channels and other distribution agents that are configured for the distribution of inventory to consumers or sources consumption.

"Server" is a computer or other data processing apparatus that is capable of carrying out server-side operations.

It is submitted that the various embodiments described above can provide a means whereby an efficient distribution of inventory can be made between various distribution channels for that inventory. This is particularly important where significant data is generated that could place undue load on data processors. In such cases, administrators, for example, servers, can find it difficult to investigate the performance of connected distribution channels and, in response, make changes to parameters of inventory. As is clear from the above description, the method of using a central computer system can provide a means whereby the administrators can maintain control of inventory parameters such as supply rates with a processor load that would not be possible without the steps of the embodiments of the method.

The database management techniques described above, such as independent processing, in particular for processes that involve interaction between the central server and the distributed servers, and also processes that execute only central server side, provide embodiments that are diverse and suitable, for controlling overall efficiency, reliability, and redundancy, as uniquely required by different applications.

Further, incorporating the use of individual- and group indictors, as explained in these embodiments, facilitates those kinds of applications described by maintaining a sufficient degree of conditional relationships between distributed database fields, while also reaping the efficiency and redundancy benefits.

The appended claims are to be considered as incorporated into the above description.

Throughout the specification, including the claims, where the context permits, the term "comprising" and variants thereof such as "comprise" or "comprises" are to be interpreted as including the stated integer or integers without necessarily excluding any other integers.

It is to be understood that the terminology employed above is for the purposes of description and should not be regarded as limiting. The described embodiments are intended to be illustrative of the invention, without limiting the scope thereof. The invention is capable of being practiced with various modifications and additions as will readily occur to those skilled in the art.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise: there is no requirement for the inclusion of any particular described or illustrated characteristic, function, activity, or element, any particular sequence of activities, or any particular interrelationship of elements; no characteristic, function, activity, or element is "essential"; any elements can be integrated, segregated, and/or duplicated; any activity can be repeated, any activity can be performed by multiple entities, and/or any activity can be performed in multiple jurisdictions; and any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Words indicating direction or orientation, such as "front", "rear", "back", etc., are used for convenience. The inventor(s) envisages that various embodiments can be used in a non-operative configuration, such as when presented for sale. Thus, such words are to be regarded as illustrative in nature, and not as restrictive.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

We claim:

1. A computer-implemented method of managing online bookings for transportation services inventory, the computer-implemented method comprising:
    linking, via a computerized network, each item in the transportation services inventory with one of a plurality of online distributions channels by allocating the item to the respective online distribution channel;
    receiving, from each of the plurality of online distribution channels in real time via the computerized network, sale data pertaining to the online bookings for the items in the transportation services inventory allocated to the respective online distribution channel;
    processing the sale data by carrying out calculations to obtain a performance rating for each of the respective online distribution channels;
    querying whether the performance rating of each of the respective online distribution channels is greater than a performance rating of other online distribution channels; and
    based on the query being answered in the affirmative, carrying out at least one of the following:
        adjusting, via the computerized network, a price of the items in the transportation services inventory allocated to each of the linked online distribution channels; and
        modifying, via the computerized network, the linkage of the items in the transportation services inventory to the respective online distribution channels by re-allocating the items in the transportation services inventory to or from said each of the online respective distribution channels from or to the other online distribution channels.

2. The computer-implemented method of claim 1, wherein the processing the sale data comprises determining whether or not a supply of transportation services inventory exceeds demand or vice versa per online distribution channel.

3. The computer-implemented method of claim 1, wherein the processing the sale data comprises calculating a sale rate index for each of online distribution channels in a form of a ratio of a number of items sold within a predetermined period of time via the respective online distribution channel to a number of items available for sale via the respective online distribution channel.

4. The computer-implemented method of claim 1, wherein the sale data is in a form of data relating to sale price of each item in the transportation services inventory.

5. The computer-implemented method of claim 1, wherein the sale data is in a form of data relating to a number of the items in the transportation services inventory sold within a predetermined period of time.

6. The computer-implemented method as claimed in claim 1, further comprising rendering, via a channel connection interface corresponding to each online distribution channel, transportation services inventory data pertaining to the linked items in the transportation services inventory.

7. The computer-implemented method as claimed in claim 6, further comprising generating a data structure that is used by the channel connection interface to perform the linking.

8. The computer-implemented method as claimed in claim 1, further comprising configuring a plurality of computing devices as the plurality of online distribution channels that distribute the transportation services inventory allocated to the respective online distribution channel.

9. A non-transitory computer-readable storage medium, the non-transitory computer-readable storage medium storing computer instructions to be implemented on at least one computing device including at least one processor, the computer instructions when executed by the at least one processor cause the at least one computing device to:
    link, via a computerized network, each item in transportation services inventory with one of a plurality of online distributions channels by allocating the item to the respective online distribution channel;
    receive, from each of the plurality of online distribution channels in real time via the computerized network, sale data pertaining to online bookings for the items in the transportation services inventory allocated to the respective online distribution channel;
    process the sale data by carrying out calculations to obtain a performance rating for each of the respective online distribution channels;
    query whether the performance rating of each of the respective online distribution channels is greater than a performance rating of other online distribution channels; and
    based on the query being answered in the affirmative, carrying out at least one of the following:
        adjust, via the computerized network, a price of the items in the transportation services inventory allocated to each of the linked online distribution channels; and
        modify, via the computerized network, the linkage of the items in the transportation services inventory to the respective online distribution channels by re-allocating the items in the transportation services inventory to or from said each of the online respective distribution channels from or to the other online distribution channels.

10. The non-transitory computer-readable storage medium of claim 9, wherein the at least one processor is further caused to determine whether or not a supply of transportation services inventory exceeds demand or vice versa per online distribution channel.

11. The non-transitory computer-readable storage medium of claim 9, wherein the processing the sale data comprises calculating a sale rate index for each of online distribution channels in a form of a ratio of a number of items sold within a predetermined period of time via the respective online distribution channel to a number of items available for sale via the respective online distribution channel.

12. The non-transitory computer-readable storage medium of claim 9, wherein the sale data is in a form of data relating to sale price of each item in the transportation services inventory.

13. The non-transitory computer-readable storage medium of claim 9, wherein the sale data is in a form of data relating to a number of the items in the transportation services inventory sold within a predetermined period of time.

14. The non-transitory computer-readable storage medium of claim 9, wherein the at least one processor is further caused to render, via a channel connection interface corresponding to each online distribution channel, transportation services inventory data pertaining to the linked items in the transportation services inventory.

15. The non-transitory computer-readable storage medium of claim 14, wherein the at least one processor is further caused to generate a data structure that is used by the channel connection interface to perform the linking.

16. The non-transitory computer-readable storage medium of claim 9, wherein the at least one processor is further caused to configure a plurality of computing devices as the plurality of online distribution channels that distribute the transportation services inventory allocated to the respective online distribution channel.

17. A computing server that manages online bookings for transportation services inventory, the computing server comprising:
  a memory device; and
  at least one processor configured to perform a method for managing the online bookings for the transportation services inventory, the method comprising:
    linking, via a computerized network, each item in the transportation services inventory with one of a plurality of online distributions channels by allocating the item to the respective online distribution channel;
    receiving, from each of the plurality of online distribution channels in real time via the computerized network, sale data pertaining to the online bookings for the items in the transportation services inventory allocated to the respective online distribution channel;
    processing the sale data by carrying out calculations to obtain a performance rating for each of the respective online distribution channels;
    querying whether the performance rating of each of the respective online distribution channels is greater than a performance rating of other online distribution channels; and
    based on the query being answered in the affirmative, carrying out at least one of the following:
      adjusting, via the computerized network, a price of the items in the transportation services inventory allocated to each of the linked online distribution channels; and
      modifying, via the computerized network, the linkage of the items in the transportation services inventory to the respective online distribution channels by re-allocating the items in the transportation services inventory to or from said each of the online respective distribution channels from or to the other online distribution channels.

18. The computing server of claim 17, wherein the processing the sale data comprises determining whether or not a supply of transportation services inventory exceeds demand or vice versa per online distribution channel.

19. The computer-implemented method as claimed in claim 17, wherein the method further comprises rendering, via a channel connection interface corresponding to each online distribution channel, transportation services inventory data pertaining to the linked items in the transportation services inventory.

20. The computer-implemented method as claimed in claim 19, further comprising (i) generating a data structure that is used by the channel connection interface to perform the linking and (ii) storing the data structure in the memory device.

21. A computer-implemented method of managing one or more online bookings for transportation services inventory, the computer-implemented method comprising:
  means for linking, via a computerized network, each of a plurality of items in the transportation services inventory with one of a plurality of online distribution channels, thereafter each being a linked online distribution channel in a plurality of linked online distribution channels, by allocating each of the plurality of items to the corresponding linked online distribution channel;
  means for receiving, from each of the plurality of linked online distribution channels in real time via the computerized network, sale data pertaining to the one or more online bookings for one or more of the items in the plurality of items allocated to the corresponding linked online distribution channel;
  means for processing the sale data by carrying out calculations to obtain a performance rating for each of the plurality of linked online distribution channels;
  means for determining that the performance rating of at least one of the plurality of linked online distribution channels is better than the performance rating of other linked online distribution channels in the plurality of linked online distribution channels; and
  based on the determination, carrying out at least one of the following:
    means for adjusting, via the computerized network, a price of said one or more of the items allocated to the corresponding linked online distribution channel; and
    means for modifying, via the computerized network, the linkage of said one or more of the items to the corresponding linked online distribution channel by re-allocating said one or more of the items in the transportation services inventory to or from the corresponding linked online respective distribution channel in the plurality of linked online distribution channels from or to one or more of the other linked online distribution channels in the plurality of linked online distribution channels.

22. The computer-implemented method as claimed in claim 21, further comprising:
  means for establishing, for each of the plurality of linked online distribution channels, a channel connection interface that (i) receives a user input selecting one of the plurality of linked online distribution channels and (ii) sends transportation services inventory data pertaining to said one or more of the items linked to the corresponding linked online distribution channel.

23. A computer-implemented method of managing one or more online bookings for transportation services inventory, the computer-implemented method comprising:
  means for linking, via a computerized network, each of a plurality of items in the transportation services inventory with one of a plurality of online distribution channels, thereafter each being a linked online distribution channel in a plurality of linked online distribution channels, by allocating each of the plurality of items to the corresponding linked online distribution channel;

means for receiving, from each of the plurality of linked online distribution channels in real time via the computerized network, sale data pertaining to the one or more online bookings for one or more of the items in the plurality of items allocated to the corresponding linked online distribution channel;

means for processing the sale data by carrying out calculations to obtain a performance rating for each of the plurality of linked online distribution channels;

means for determining that the performance rating of at least one of the plurality of linked online distribution channels is worse than the performance rating of other linked online distribution channels in the plurality of linked online distribution channels; and based on the determination, carrying out at least one of the following:

means for adjusting, via the computerized network, a price of said one or more of the items allocated to the corresponding linked online distribution channel; and means for modifying, via the computerized network, the linkage of said one or more of the items to the corresponding linked online distribution channel by re-allocating said one or more of the items in the transportation services inventory to or from the corresponding linked online respective distribution channel in the plurality of linked online distribution channels from or to one or more of the other linked online distribution channels in the plurality of linked online distribution channels.

24. The computer-implemented method as claimed in claim 23, further comprising:

means for establishing, for each of the plurality of linked online distribution channels, a channel connection interface that (i) receives a user input selecting one of the plurality of linked online distribution channels and (ii) sends transportation services inventory data pertaining to said one or more of the items linked to the corresponding linked online distribution channel.

\* \* \* \* \*

UNITED STATES PATENT AND TRADEMARK OFFICE
CERTIFICATE OF CORRECTION

PATENT NO. : 11,334,598 B2
APPLICATION NO. : 17/542933
DATED : May 17, 2022
INVENTOR(S) : Andrew Loch et al.

It is certified that error appears in the above-identified patent and that said Letters Patent is hereby corrected as shown below:

On the Title Page

Item [30], insert:
--May 18, 2006 (AU) ......................... 2006902685--

Signed and Sealed this
Twenty-third Day of August, 2022

Katherine Kelly Vidal
Director of the United States Patent and Trademark Office